(12) United States Patent
Marya et al.

(10) Patent No.: US 8,663,401 B2
(45) Date of Patent: *Mar. 4, 2014

(54) DEGRADABLE COMPOSITIONS, APPARATUS COMPRISING SAME, AND METHODS OF USE

(75) Inventors: Manuel P. Marya, Sugar Land, TX (US); Rashmi B. Bhavsar, Houston, TX (US); Gary L. Rytlewski, League City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,907

(22) Filed: Nov. 21, 2011

(65) Prior Publication Data

US 2012/0080189 A1  Apr. 5, 2012

Related U.S. Application Data

(63) Continuation of application No. 11/427,233, filed on Jun. 28, 2006, now Pat. No. 8,211,247.

(60) Provisional application No. 60/771,627, filed on Feb. 9, 2006, provisional application No. 60/746,097, filed on May 1, 2006.

(51) Int. Cl.
 *C22C 21/00* (2006.01)
(52) U.S. Cl.
 USPC .......................................... 148/400; 166/279
(58) Field of Classification Search
 USPC .......................................... 148/400; 166/279
 See application file for complete search history.

(56) References Cited

U.S. PATENT DOCUMENTS 3,687,135 A  8/1972 Stroganov et al.
4,270,761 A  6/1981 Hertz, Jr.
(Continued)

FOREIGN PATENT DOCUMENTS

EP  178334 B1  7/1990
EP  1605281 B1  5/2006
(Continued)

OTHER PUBLICATIONS

Search and Examination Report mailed May 26, 2013 for GCC Application No. GCC/P/2007/7739, 11 pages.
(Continued)

*Primary Examiner* — Jie Yang
(74) *Attorney, Agent, or Firm* — Jeffery R. Peterson; Brandon Clark

(57) ABSTRACT

Compositions, apparatus incorporating a composition, and methods of use are described, one composition embodiment consisting essentially of one or more reactive metals in major proportion, and one or more alloying elements in minor proportion, with the provisos that the composition is high-strength, controllably reactive, and degradable under defined conditions. Compositions of the invention may exist in a variety of morphologies, including a reactive metal or degradable alloy processed into an alloy of crystalline, amorphous or mixed structure that may constitute the matrix of other composition, for instance a composite. Methods of using apparatus comprising a composition, particularly in oilfield operations are also described (e.g. flow and displacement control, sensors, actuators). This abstract allows a searcher or other reader to quickly ascertain the subject matter of the disclosure. It will not be used to interpret or limit the scope or meaning of the claims.

11 Claims, 8 Drawing Sheets

(56) References Cited

U.S. PATENT DOCUMENTS

| | | |
|---|---|---|
| 4,664,816 A | 5/1987 | Walker |
| 4,919,209 A | 4/1990 | King |
| 5,204,183 A | 4/1993 | McDougall et al. |
| 5,417,285 A | 5/1995 | Van Buskirk et al. |
| 6,162,766 A | 12/2000 | Muir et al. |
| 6,261,432 B1 * | 7/2001 | Huber et al. ............ 205/73 |
| 6,457,525 B1 * | 10/2002 | Scott ...................... 166/300 |
| 6,561,270 B1 * | 5/2003 | Budde ..................... 166/153 |
| 6,866,306 B2 | 3/2005 | Boyle et al. |
| 6,966,368 B2 * | 11/2005 | Farquhar .................. 166/128 |
| 7,285,772 B2 | 10/2007 | Labous et al. |
| 7,322,417 B2 | 1/2008 | Rytlewski et al. |
| 8,220,554 B2 * | 7/2012 | Jordan et al. .............. 166/376 |
| 2002/0004060 A1 | 1/2002 | Heublein et al. |
| 2003/0116608 A1 | 6/2003 | Litwinski |
| 2004/0043906 A1 | 3/2004 | Heath et al. |
| 2004/0188090 A1 | 9/2004 | Vaeth et al. |
| 2006/0035074 A1 | 2/2006 | Taylor |
| 2006/0175059 A1 | 8/2006 | Sinclaire et al. |
| 2006/0266551 A1 | 11/2006 | Yang et al. |
| 2007/0044958 A1 | 3/2007 | Rytlewski et al. |
| 2007/0107908 A1 | 5/2007 | Vaidya et al. |
| 2008/0018230 A1 | 1/2008 | Yamada et al. |
| 2008/0149345 A1 | 6/2008 | Marya et al. |
| 2008/0149351 A1 | 6/2008 | Marya et al. |
| 2010/0209288 A1 | 8/2010 | Marya |

FOREIGN PATENT DOCUMENTS

| | | |
|---|---|---|
| RU | 2073696 C1 | 2/1997 |
| RU | 2149247 | 5/2000 |
| SU | 1733617 | 5/1992 |
| WO | 0248503 A1 | 6/2002 |
| WO | 2005090742 A1 | 9/2005 |
| WO | 2008079485 A2 | 7/2008 |

OTHER PUBLICATIONS

Official Action of Substantive Examination mailed Oct. 18, 2012 for RU Application No. 2010124372/03(034771), 3 pages (English translation).

* cited by examiner

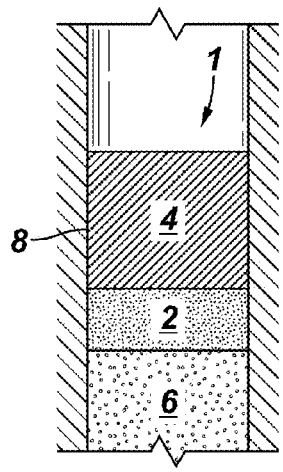
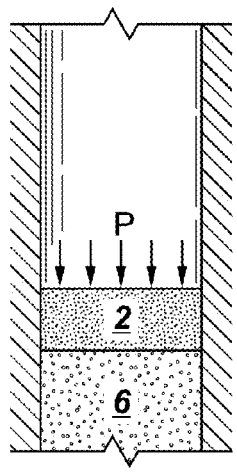
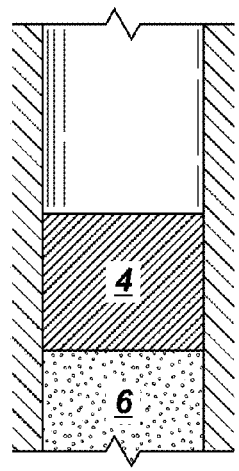
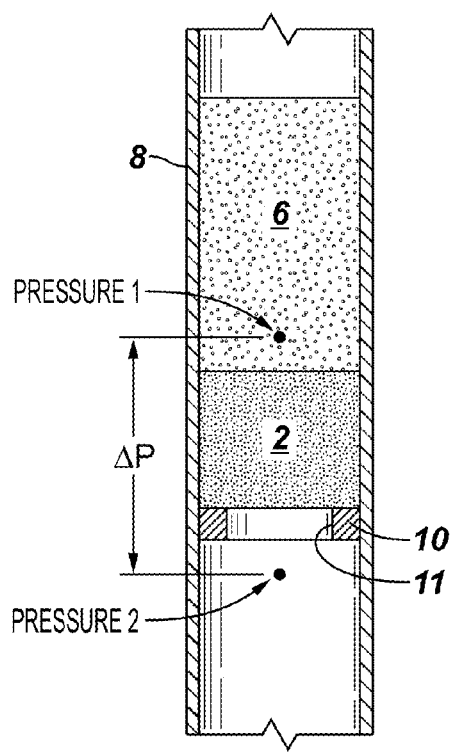
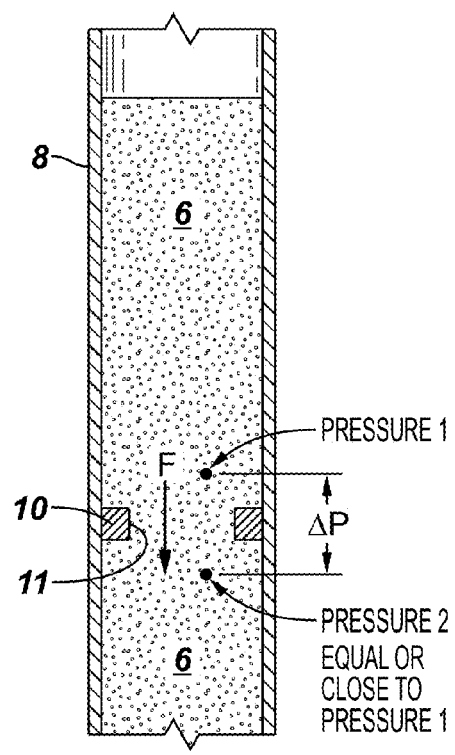

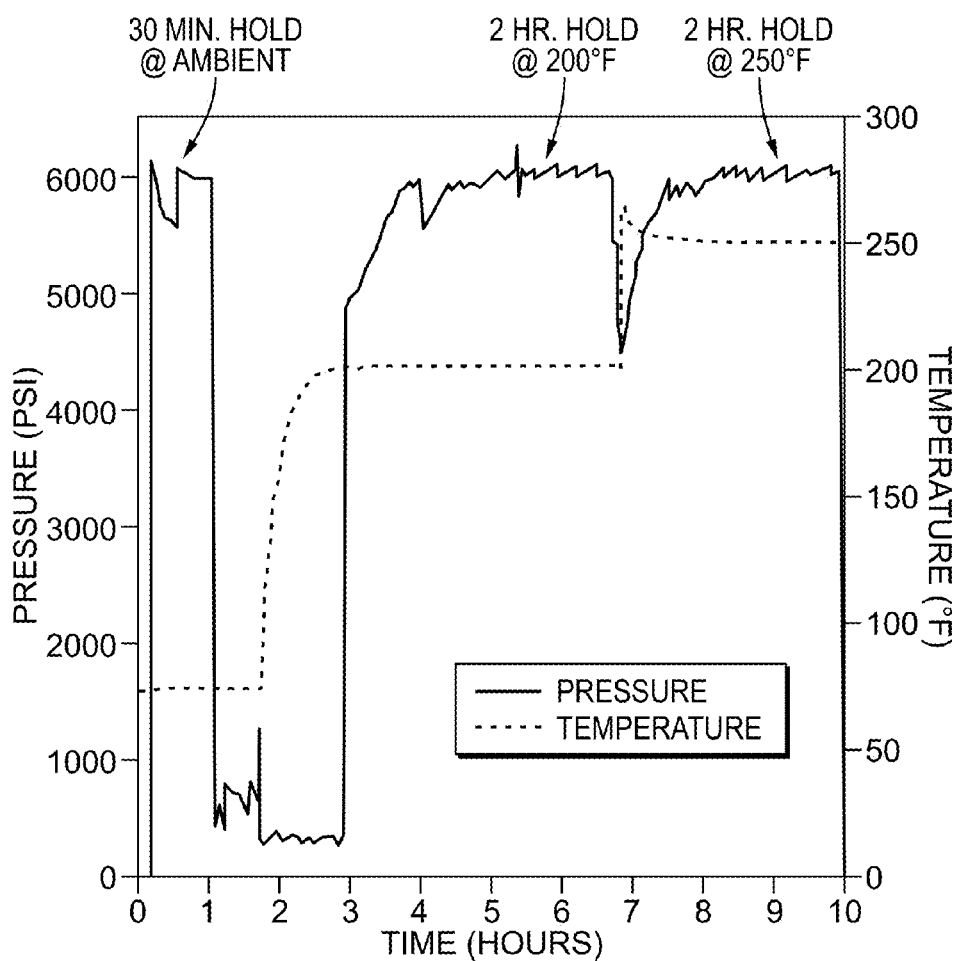

FIG. 12
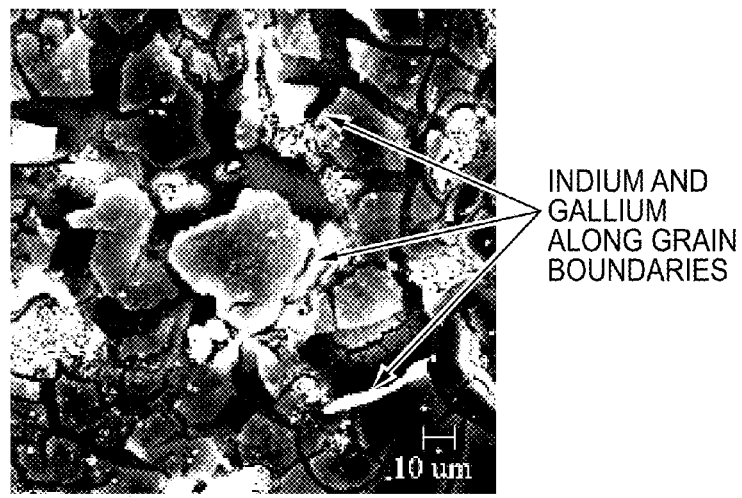
INDIUM AND GALLIUM ALONG GRAIN BOUNDARIES
*FIG. 12A*    *FIG. 12B*    *FIG. 12C*    *FIG. 12D*
Al           Ga          In            O
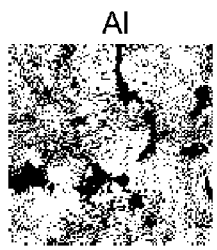  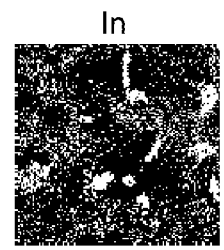 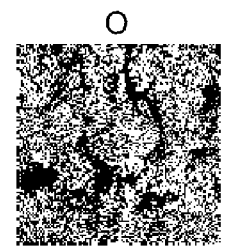
*FIG. 13*        *FIG. 14*
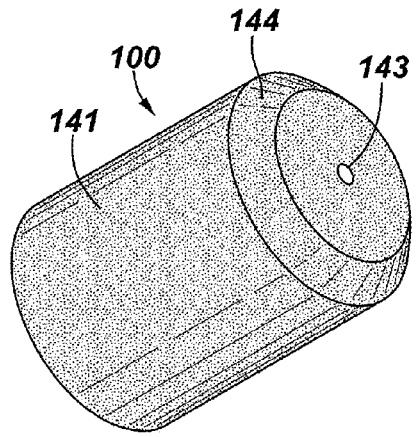 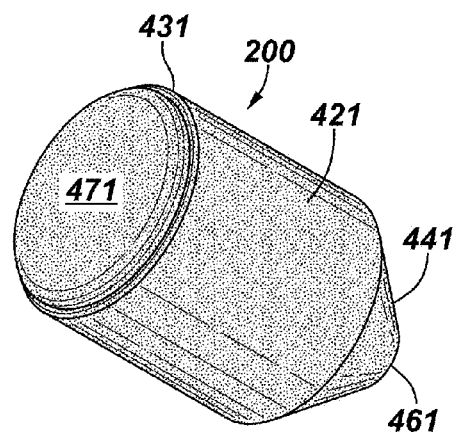

DEGRADABLE COMPOSITIONS, APPARATUS COMPRISING SAME, AND METHODS OF USE

CROSS-REFERENCE TO RELATED APPLICATIONS

The present application is a continuation of U.S. patent application Ser. No. 11/427,233 (now U.S. Pat. No. 8,220, 554), filed on Jun. 28, 2006, which claims priority under 35 U.S.C. §119(e) to U.S. Provisional Application Ser. Nos. 60/771,627, filed Feb. 9, 2006, and 60/746,097, filed May 1, 2006, the contents of which are incorporated by reference herein in their entirety.

BACKGROUND OF THE INVENTION

1. Field of Invention

The present invention relates generally to the field of oilfield exploration, production, and testing, and more specifically to compositions, apparatus comprising these compositions, and methods of using same.

2. Related Art

Existing structural compositions, that is materials and combinations of materials, have been developed to sustain elevated loads (forces, stresses, and pressures) at useful ranges of temperatures, and also not to react, and thus degrade by dissolving, disintegrating, or both in the presence of common fluids such as water, or moist air. Note, for a better understanding of the invention, that a composition is here defined as a tangible element created by arranging several components, or sub-compositions, to form a unified whole; the definition of composition is therefore expanded well beyond material chemical composition and includes all combinations of materials that are used smartly to achieve the purposes of the invention.

Structural compositions found in everyday applications (mainly metals and alloys) are required to be durable over intended element lifetimes; i.e. they must be chemically inert, or not reactive, even though many rust or corrode over the intended element lifetimes. In generic terms, a reactive metal may be defined as one that readily combines with oxygen to form very stable oxides, one that also interacts with water and produces diatomic hydrogen, and/or one that becomes easily embrittled by interstitial absorption of oxygen, hydrogen, nitrogen, or other non-metallic elements. There are clearly various levels of reactivity between metals, alloys, or in general compositions, or simply any element listed on the periodic table. For instance, compared to iron or steels (i.e. alloys of iron), aluminum, magnesium, calcium and lithium are reactive; lithium being the most reactive, or least inert of all four. Reactive metals are properly grouped in the first two columns of the Periodic Table of the Elements (sometimes referred to as Column I and II elements); i.e., among the alkaline and alkaline-earth elements. Of the alkaline metals, namely lithium (Li), sodium (Na), potassium (K), rubidium (Rb), cesium (Cs), francium (Fr), and alkaline-earth metals, namely beryllium (Be), magnesium (Mg), calcium (Ca), strontium (Sr), barium (Ba), radium (Ra), few may be directly utilized for the excellent reasons that they are either 1) far too reactive to be handled safely and thus be readily procurable to be useful for any commercial applications, or 2) not sufficiently reactive as they for instance passivate in aqueous environments and thus form stable protective barriers (e.g. adherent oxides and hydroxide films), or 3) their rate of reaction or transformation, and thus degradation, is too slow, as it is for instance seen when magnesium, aluminum and their commercial alloys are immersed in cold and neutral water (i.e. neither acidic nor basic; pH=7). Though profoundly less reactive than the alkaline and alkaline-earth metals, aluminum may be also included among the reactive metals. Yet, aluminum does not react, or degrade with water nearly to the same extents as the Columns I and II elements since aluminum is a typical material used in durable elements for applications as diverse as automotive, aerospace, appliances, electrical, decoration, and the like. To quantify reactivity of an element, galvanic corrosion potentials may be used, or if unavailable measured, as for instance for any novel composition compared to a reference, for instance the hydrogen reaction; for instance the higher the potential of a composition with respect to hydrogen the lesser its reactivity and its likelihood to degrade noticeably, or rapidly. Because reactivity of an element is linked to the ease chemical reactions proceed with non-metallic elements (e.g. oxygen, nitrogen), for periodic table elements electronegativity constitutes an excellent measure of reactivity. Electronegativity, and especially corrosion potential of aluminum are sufficiently low compared to the other elements of the periodic table to categorize aluminum as a reactive metal rather than a non-reactive, inert or noble metal or element.

In numerous environments, including in the oilfield but not exclusively, it would be advantageous to be able to utilize a component comprised of a reactive composition comprising alkaline, alkaline-earth elements, or other metal (e.g. aluminum) having either an enhanced reactivity (e.g. compositions comprising aluminum) or reduced reactivity (e.g. compositions comprising calcium) relative to that of the (pure or unalloyed) alkaline or alkaline-earth elements in the composition. It would also be of great benefit to controllably enhance or delay the interaction or degradation of the reactive compositions with its fluidic environment; an environment that may comprise water, completion fluids, and the like and will therefore be corrosive to the inventive composition. The compositions of interest are those that degrade by either dissolving or disintegrating, or both when demanded by the application or the user. The degradation may proceed within minutes, hours, days or weeks depending upon the application requirements; in oilfield environments typical time for degradation may range from minutes to days, occasionally weeks.

Among the multitude of oilfield examples that may be foreseen for degradable compositions is that of a diverter ball. A diverter ball is a solid object that is dropped or pumped through wellbore tubulars in a process known as diversion and may be utilized in operations known as acidizing and fracturing. Both acidizing and fracturing are well-known operations to the skilled artisan and require little further explanation. In other well operations, perhaps less well-known than the latter, balls are employed as downhole valves in different fracturing zones by serving as temporary plugs to isolate fluids from different zones. In the present context the term "ball" extends beyond that typically associated to spherical shapes and includes bars, plugs, darts, and any other shaped members, and is more generally referred to herein as well operating elements.

In previously-known well operations, diverter balls and fracturing elements are either flowed to the surface or dropped to the bottom of the wellbore once their function is completed. Since they are not degradable in the wellbore environment, or their rate or location of dissolution are essentially uncontrolled or extremely sluggish their use has been nearly non-existent. In some applications, the dissolvable composition loses structural integrity and thus its ability to isolate fluids from distinct zones from mechanical action, contact with a fluid, heat, or combination thereof, and before dissolving it may be pumped to the surface with well fluids, or dropped to the bottom of the wellbore.

In many well operations, including diverter balls, it is desirable to possess well operating elements that controllably degrade either in rate, location of the element, or both (or include a portion that predictably degrades) in the wellbore environment, without having to resort to highly acid conditions, high temperatures, mechanical milling, or a combination of these. Since none of the known drop balls, diverter balls, and the like have the ability to degrade in a controlled user defined fashion, such degradable elements, and compositions could potentially be in high demand in both the oilfield and elsewhere, as further detailed in subsequent sections.

SUMMARY OF THE INVENTION

In accordance with the present invention, compositions, apparatus comprising an inventive composition, and methods of using same are described that reduce or overcome limitations of previously known compositions, apparatus and methods. By combining reactive metals and their properties with other relatively reactive or non-reactive supplemental components, including in certain embodiments alloying elements, the inventive compositions (for example, but not limited to alloys, composites, and smart combinations of materials) are formed and may be utilized to advantage especially in oilfield elements and methods of use in oilfield operations. The compositions and apparatus of the invention may be applied to a multitude of oilfield purposes, including, but not limited to, opening completion valves, fluid diversion, sealing off lower layers during fracturing operations, actuators, sensors, and switches. As one example of a composition, apparatus and method of use of the invention, a highly reactive composition consisting essentially of a degradable element, for example dissolving within minutes, may be protected by a coating that specifically becomes dysfunctional at or about reservoir temperature and remains functional as long as relatively cool fracturing fluid is pumped or injected into the well to maintain the integrity of the protective coating. Such embodiments of the invention, though simplistically described in this example, offer new advantages to temporarily separate fluids from a multitude of zones. The apparatus, which may be termed a well operating element, or simply an element, once allowed to warm up for instance to the reservoir temperature, first fails for instance by the melting or fracture of its coating, among other mechanisms, before fully degrading by dissolution, disintegration, or both. When the element becomes dysfunctional, the element may not yet be entirely degraded and therefore may either fall or float to a new position but without obstructing well operation. In this and other embodiments of the invention, no intervention is therefore required to remove the element after its useful life of diverting the flow is completed.

A first aspect of the invention is a composition consisting essentially of one or more reactive metals in major proportion, and one or more alloying elements in minor proportion, with the provisos that the composition is high-strength, controllably reactive, and degradable under defined conditions.

Exemplary compositions of the invention may exist in a variety of morphologies (i.e., physical forms on the atomic scale), including 1) a reactive metal or alloy of crystalline, amorphous or mixed crystalline and amorphous structure, and the features characterizing the composition (e.g. grains, phases, inclusions, and the like) may be of micron or submicron scale, for instance nanoscale; 2) powder-metallurgy like structures (e.g. pressed, compacted, sintered) including an inventive composition including at least one relatively reactive metal or alloy combined with other metals, alloys or compositions that preferentially develop large galvanic couples with the reactive metal or elements in the non-intragalvanic degradable alloy; and 3) composite and hybrid structures comprising one or more reactive metals or alloys as a metal matrix, imbedded with one or more relatively non-reactive materials of macro-to-nanoscopic sizes (e.g. powders, particulates, platelets, flakes, fibers, compounds, and the like) or made for instance from stacks of layers of dissimilar metals, alloys and compositions with the provisos that certain layers are reactive. Of all compositions of the invention certain are alloy compositions comprising a reactive metal selected from elements in columns I and II of the Periodic Table combined with at least one element (alloying element) that, in combination with the reactive metal, produces a high-strength, controllably reactive and degradable metallic composition having utility as an oilfield element, among other uses. Exemplary compositions within the invention include compositions wherein the reactive metal is selected from calcium, magnesium, aluminum, and wherein the at least one alloying element is selected from lithium, gallium, indium, zinc, bismuth, calcium, magnesium, and aluminum if not already selected as the reactive metal, and optionally a metallic solvent to the alloying element. Another class of compositions within the invention is an entirely novel class of aluminum alloys wherein aluminum is made considerably more reactive than commercially available aluminum and aluminum alloys. To enhance reactivity of aluminum, aluminum is essentially alloyed with gallium, indium, among other elements such as bismuth or tin for example. For commercial applications, including in the oilfield, aluminum is particularly attractive because of its availability worldwide, relatively low cost, high processability (e.g. aluminum can be cast, welded, forged, extruded, machined, and the like), and non-toxicity; thus aluminum and its alloys may be safely handled during fabrication, transportation, and final use of the degradable element. Other inventive compositions are composite or hybrid structures, for instance made from those novel aluminum alloys. A non-restrictive example of these innovative compositions is a metal-matrix composite of these degradable aluminum alloys reinforced by ceramic particulates or fibers, itself coated with one or several other compositions, possibly metallic, ceramic, polymeric.

Compositions of the invention may be formed or processed into shaped articles of manufacture (referred to herein as apparatus or elements), solid parts as well as hollow parts, or partially hollow parts with one or more coatings on all or only selected surfaces. The coatings may also vary from one surface to the other, and a surface may be coated with one or multiple layers (thus generating a functionally graded composite composition) depending upon the applications needs. Consequently certain compositions of the invention may themselves serve as coatings on substrates, such as metal, plastic, and ceramics, wherein the compositions of the invention may be applied by processes such as co-extrusion, adhesive bonding, dipping, among other processes. Certain shaped articles of the invention, or components thereof, may be termed oilfield elements that are useful in oilfield operations, but the invention is not so limited. Useful oilfield elements include, but are not limited to, balls, darts, and the like useful for operating valves, serving as plugs, wellbore fluid diversion devices, and other wellbore treatment and production applications. In certain oilfield elements of the invention the shape of the composition may further contribute to the controllably reactive and degradable nature of the composition, and thus of the oilfield element. Certain apparatus comprising an inventive composition may resemble fuses or mesh in their operation; for instance the longer they are the later the element becomes dysfunctional.

The controllability of the reactivity and thus degradability may in certain embodiments depend on the physical form, or morphology of the composition. The morphology of the composition may be selected from pure metals, alloys purposely formulated to be reactive, for example pressed, compacted, sintered, or metallic-based composites and hybrid metallic compositions or combinations, for example, but not limited to metal matrix embedded with relatively inert ingredients, metallic mesh compositions, coated metallic compositions, multilayered and functionally graded metallic compositions, that degrade either partially or totally, immediately or after well-controlled and predictable time once exposed to a fluid (liquid and/or gaseous), either fully or partially aqueous (water and water-based fluids), organic, metallic (e.g. liquid metals), organometallic compounds of the formula RM, wherein R is a carbon (and in certain cases, silicon, or phosphorous) directly attached to a metal M, and combinations thereof. Compositions within the invention include those that are highly sensitive to the presence of water, including water vapor, or humidity. The fluid environment, that is either a liquid or gas is corrosive (moderately to highly) to compositions of the invention. Nanomaterials, either carbon-based (e.g. carbon nanotubes—single wall or multi-wall, buckyballs, nanofibers, nanoplatelets, and derivatized versions of these) or non-carbon-based of all types of morphologies, may be used to further develop new compositions and further alter the strength or the reactivity of the inventive compositions, when added to inventive compositions like alloys for instance.

The inventive compositions are degradable, and may be categorized as biodegradable when formulated to be safe or friendly to the environment and when used in moderate concentrations. Use of regulated compositions, including those comprising hazardous elements has been restricted; for instance lead (Pb) and cadmium (Cd) that are both technically desirable for alloy formulation are avoided in compositions of the invention, whenever possible.

As used herein the term "high-strength" means the compositions of the invention possess intrinsic mechanical strengths, including quasi-static uniaxial strengths and hardness values at least equal to and typically greater than that of pure metals. Their strength is such that they can withstand thousands of pounds-per-square-inch pressures for extended periods of time, depending upon needs of the applications or users. High-strength also refers to non-metallic compositions, in particular plastics for which strength at room temperatures or higher temperatures is typically considerably smaller than that of metals or alloys. It is implied here that strength of compositions of the invention at room-temperature and downhole temperatures may be defined as high relative to that of the plastics. As used herein the term "controllably reactive" refers to compositions that "react" in the presence of fluids typically considered non-reactive or weakly reactive to oil and gas engineering compositions. Compositions of the invention are engineered smartly to either exhibit enhanced reactivity relative to the pure reactive metals, or delay the interaction of the reactive metals with the corrosive fluid. Compositions of the invention also include those that degrade under conditions controlled by oilfield personnel. A composition that disintegrates is one that looses structural integrity and eventually breaks down in pieces or countless small debris. As used herein the term "degradable" refers to compositions that are partially or wholly consumed because of their relatively high reactivity. Compositions of the invention that are considered reactive and degradable include those that are partially or wholly dissolvable (soluble) in the designated fluid environment, as well as those that disintegrate but do not necessarily dissolve. Also, the reaction byproducts of a degradable composition of the invention may not be soluble, since debris may precipitate out of the fluid environment. "Hybrid", as used herein to characterize an inventive composition, refers to combinations of distinct compositions used together as a part of a new and therefore more complex composition because of their dissimilar reactivities, strengths, among other properties. Included are composites, functionally-graded compositions and other multilayered compositions regardless of scale. In order of increasing reactivity are macro-, meso-, micro- and nanoscale compositions. These scales may be used in the composition to further control reactivity, thus rate of degradation.

Another aspect of the invention are articles of manufacture (apparatus), including oilfield elements and well operating elements as herein defined, comprising one or more compositions of the invention. The common denominator between a majority of the proposed applications is the use of an inventive composition to control flow (and displacement), or pressure (and force); flow is associated with pressure and displacement to force; one is the consequence of the other, according to Newton's law and Bernoulli's law, respectively. Apparatus of the invention may be a flow control element, a pressure control element, and the like. As used herein the phrase "flow and displacement control element" includes, but is not limited to: plugs; proppants; valves (including temporary flappers); seals (another means to control or restrict a flow); flotation apparatus, wherein degradation of the apparatus releases a force, such as buoyancy force, which controls displacement; and displacement apparatus, wherein the inventive apparatus controllably degrades and releases another force. Another example of an inventive apparatus for displacement control that may have applications in actuators and sensors is the combination of a preloaded compression spring placed against a degradable element wherein upon degradation the spring releases its stored energy through a displacement. Such apparatus and their methods of use, with compressive springs or any other like devices may find applications well beyond oilfields; e.g. in power plants, including nuclear power plants. Apparatus of the invention comprising a reactive composition of the invention may be utilized in actuators, sensors, detectors, wherein degradation may not occur in the well fluids but other fluids; e.g. cooling fluids such as liquid metals and alloys. Inventive apparatus may also take the form of a moisture getter, wherein interaction with moisture controls humidity in a component where moisture and/or humidity are not tolerated, for example electronic components. Other possible applications are discussed further herein.

In use, introduction of an alloying element or elements may function to either restrict or on the contrary enhance degradation of the reactive component by limiting either the rate and/or location (i.e., front, back, center or some other location of an apparatus comprising the composition), as in the example of a non-uniform material. The alloying element or component may also serve to distribute loads at high stress areas, such as at a ball seat, and may function to moderate the temperature characteristic of the reactive metal such that it is not subject to excessive degradation at extreme temperature by comparison. Apparatus of the invention may comprise a coating, covering, or sheath upon a portion of or an entire outer surface of the reactive metal component, or the component may comprise one or more elements embedded into a mass of the reactive metal. The reactive metal and alloying components may comprise a shape and a composition allowing degradation of the composition so that an apparatus to which the composition is originally attached may be brought outside of a wellbore by a flowing fluid, such as by pumping, or by reservoir pressure, or floatation.

Compositions of the invention, when formed into oilfield elements, function to controllably react to therefore degrade when exposed to the wellbore conditions in a controlled fashion, i.e., at a rate and location controlled by the user of the application. In this way, zones in a wellbore, or the wellbore itself or branches of the wellbore, may be blocked for periods of time uniquely defined by the user.

Oilfield elements of the invention may be of a number of shapes, and when formed as a wellbore operating element, may be of any shape provided the element can traverse at least a portion of a wellbore and block off a perforation, or a portion of a wellbore as a wellbore plug, or to actuate (open or close) a downhole valve, or divert a fluid. Suitable shapes include cylindrical, round, bar shapes, dart shapes and the like axis-symmetrical and non-axis-symmetrical shapes. A dart shape means that the bottom has a tapered end, in some embodiments pointed, in other embodiments truncated, flat or rounded, and the like. Well operating elements of the invention will generally have first and second ends that may be tapered in shape to contribute to the ease of the element traversing through a wellbore. Certain embodiments may have one or more passages to allow well fluids or injected fluids to contact inner portions of the well operating element. Since the diameter, length, and shape of the passages through the apparatus are controllable, the rate of degradation of the apparatus may be controlled solely by mechanical manipulation of the passages, if desired. The one or more passages may extend into the apparatus a variable distance, diameter, and/or shape as desired to control the rate of degradation of the well operating element. The rate of degradation may be controllable chemically by choice of supplementary components. Well operating elements of the invention may comprise a structure wherein the composition consisting essentially of reactive metal and alloying elements is fashioned into a plurality of strips embedded in an outer surface of a relatively inert component, or some other relatively inert shaped element, such as a collet may be embedded in the composition. In other well operating elements of the invention, the composition may comprise a plurality of strips or other shapes adhered to an outer surface of a relatively inert component.

Another major aspect of the invention includes methods of using an apparatus of the invention in performing a defined task, one method comprising:
(a) formulating a composition of the invention;
(b) shaping the composition into an apparatus or portion thereof able to be deployed in a defined environment; and
(c) deploying the article during an operation in the defined environment.

Methods of the invention may include, but are not limited to, those wherein the high-strength, controllably reactive and degradable composition is an aluminum alloy, or composition such as an aluminum-alloy composite or an aluminum alloy coated with a variety of coatings, the defined environment is an oilfield environment, and the apparatus is an oilfield element. Other methods of the invention include running one or more sensors into a wellbore using one or more oilfield elements in order to define the environmental conditions of the wellbore at least where the oilfield element is to be positioned. Other methods of the invention include degrading the apparatus or portion thereof in the defined environment when the operation is completed, such as by application of acid, heat, or by degrading it in a user defined, controlled fashion. In certain methods of the invention when the apparatus is an oilfield element, as explained herein, this may result in a force, such as a buoyancy force, which may in turn act upon a valve, plug or other downhole component as desired by the well operator. The environmental conditions of the wellbore during running and retrieving may be the same or different from the environmental conditions during use in the wellbore or at the surface. Methods of the invention include those comprising using a first oilfield element to close a first completion valve positioned just below a first wellbore zone to be treated, and cooling the first oilfield element using a completion fluid having a temperature lower than a temperature of the first wellbore zone. A second oilfield element may then be used to close a second completion valve positioned above the first completion valve and just below a second wellbore zone to be treated, allowing the second oilfield element to reach the temperature of the first wellbore zone. This may be repeated multiple times for as many zones that need to be treated. The oilfield elements may then be controllably degraded to be removed in pieces, or remove a portion of the element through controlled corrosive action and allowed to float out of the wellbore, or at least to a point where they may be retrieved using convention tools.

The various aspects of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which:

FIGS. 1, 2, and 3 are diagrammatical cross-sectional views of various exemplary apparatus of the invention;

FIGS. 10, 11, and 12 are scanning electron micrographs of compositions of the invention, illustrating regions able to form galvanic cells; and FIGS. 13-17 are schematic perspective views of other apparatus embodiments in accordance with the invention.

Figure 3A:
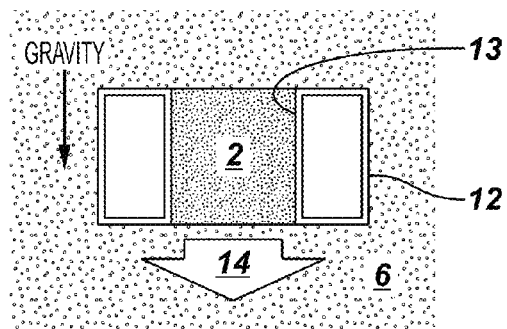
Figure 3C:
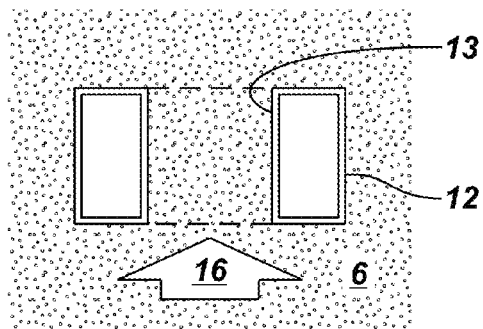
Figure 3B:
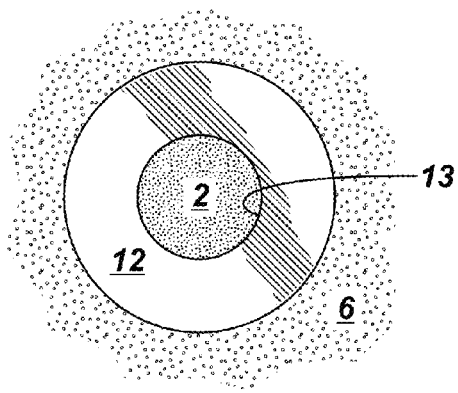
Figure 3D:
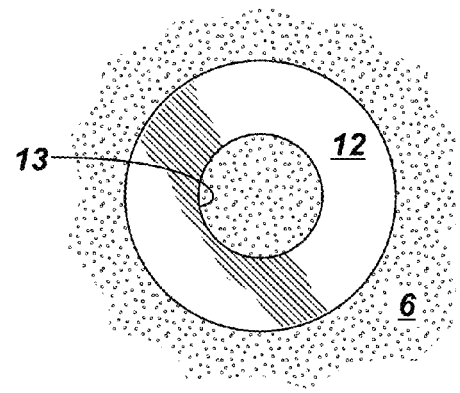

It is to be noted, however, that the appended drawings are highly schematic, not necessarily to scale, and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes compositions, shaped articles of manufacture (apparatus) employing the compositions, and methods of using the apparatus, particularly as oilfield elements, such as well operating elements, although the invention is not so limited. For example, compositions and apparatus of the invention may be employed in applications not strictly considered to be oilfield applications, for instance coalbed methane production; hydrogen generation; power plants; as components of electrical and thermal apparatus; medical instruments and implants (such as stents, catheters, prosthetics, and the like); and automotive and aerospace (transportation) components (such as engine and motor components) to name a few. When applied to oilfield applications, these may include exploration, drilling, and production activities including producing water wherein oil or gaseous hydrocarbons are or were expected. As used herein the term "oilfield" includes land based (surface and sub-surface) and sub-seabed applications, and in certain instances seawater applications, such as when exploration, drilling, or production equipment is deployed through a water column. The term "oilfield" as used herein includes oil and gas reservoirs, and formations or portions of formations where oil and gas are expected but may ultimately only contain water, brine, or some other composition.

An "oilfield element" is an apparatus that is strictly intended for oilfield applications, which may include aboveground (surface) and below-ground applications, and a "well operating element" is an oilfield element that is utilized in a well operation. Well operations include, but are not limited to, well stimulation operations, such as hydraulic fracturing, acidizing, acid fracturing, fracture acidizing, fluid diversion or any other well treatment, whether or not performed to restore or enhance the productivity of a well.

Before discussing in details the inventive compositions, some of their uses and applications are further described. Referring to the drawing figures, which admittedly are not to scale, and wherein the same reference numerals are used throughout except where noted, one application of the inventive compositions may be to simply sense, monitor, and react in the presence of a fluid "corrosive" to the composition, wherein the degradation of the inventive composition by dissolution, disintegration, or both activates a subcomponent by releasing pre-applied forces or pressures, thus generating any sort of mechanical, electrical, optical or thermal response, or any combination of these responses. Any or all of the methods and apparatus of the detailed description may be practiced in the oilfield, however, the invention is not so limited, as explained previously.

FIGS. 1A, 1B, and 1C illustrate an embodiment 1, wherein an inventive composition 2 and a subcomponent 4 are held in a pipe or other tubular 8. A corrosive fluid 6, such as water is in contact (flowing or stagnant) with one major surface of composition 2. Subcomponent 4 may be a metal or plastic piece that is forced downward toward composition 2, as depicted by arrows P in FIG. 1B (subcomponent 4 is not illustrated in FIG. 1B). After a time, which may be engineered to the desires of the operator, as composition 2 degrades for instance by dissolving, the result is illustrated in FIG. 1C. These figures illustrate that displacement and flow may be categorized as mechanical response, but the invention is not so limited and includes all applications wherein a mechanical response is linked to other devices, or creates a new response and/or signal. An electrical signal from a piezoelectric sensor would be an example of electrical response; an electric excitation to a light emitting diode (LED) is an example of an optical response; an example of thermal response would be when pressure induces a phase transformation (either exothermic or endothermic).

A major application of an inventive composition is for the control of fluid flow (and pressure) using for instance temporary plugs, as illustrated FIGS. 2A and 2B. In FIG. 2A, a fluid 6 in a tubular 8 is temporarily blocked from flowing downward from the top side of a plug 2 comprised of a composition of the invention, which is supported in tubular 8 by a support 10. Support 10 has a ring shape having an inner radial through hole opening 11. A pressure differential, $\Delta P$, is thus set up where pressure 1 is higher than pressure 2. As composition 2 degrades (for instance dissolves), eventually pressure 2 will become great enough to break the remainder of the composition, or composition 2 will simply degrade until fluid 2 is allowed to flow to pressure 2, as illustrated in FIG. 2B, until $\Delta P$ is essentially zero and fluid 6 flows downward, as indicated by arrow F. Similar uses of compositions of the invention include formation of temporary valves (e.g. flappers) and temporary seals, which may also be considered as a flow/pressure control apparatus. An example of such major application of this technology may be found with completion tools, as for instance for so-called Schlumberger treat and produce (TAP) projects.

FIGS. 3A, 3B, 3C, and 3D illustrate another application of compositions of the invention in flotation devices, wherein degradation and loss of mass of a composition 2 of the invention with time eventually enables the buoyancy force to overcome the gravitational forces and lift another component 12. Composition 2 is illustrated in FIGS. 3A (side cross-sectional view) and 3B end cross sectional view) as completely filling a hollow cavity formed by an internal surface 13 of component 12, but this is merely an example. The combined weight of composition 2 and component 12 is forced downward (arrow 14) in a fluid 6 by the force of gravity. However, as fluid 6 degrades composition 2, the situation of FIGS. 3C and 3D eventually develops, whereby component 12, in the partial or complete absence of composition 2, is able to float and move upward due to buoyancy force (arrow 16) overcoming gravity forces. This may allow component 12 to be displaced, potentially allowing its recovery, for example as a reusable subsea or downhole part, or a sensor for reuse and/or data collection and analyses, and the like.

Another use of displacement control of the inventive compositions, which may find applications for actuators and sensors, is the combination of a preloaded compression spring placed against a reactive, degradable composition of the invention wherein upon degradation of the composition, a spring releases its stored energy through a displacement. Such methods of use, with compressive springs or any other like devices may find applications well beyond oilfields; e.g. in power plants, including nuclear power plants, where the reactive degradable compositions of the inventions may be used as actuators, sensors, detectors, wherein the degradation may not occur in well fluids but other fluids; e.g. cooling fluids such as liquid metals and alloys.

Another application of the inventive compositions for flow control applies to the containment of an isolated substance; this substance, a fluid preferentially, may be at low, normal or high pressure (e.g. a gas) being released (slowly or rapidly) as its container, comprised wholly or partially of an inventive composition gradually degrades. Such containers (e.g. capsules) may serve to control the chemistry of corrosive fluids by releasing chemical agents. Such containers may be used to contain an explosive substance, as in the case for instance of rock perforating shaped charges. Shaped charges are well-known in the oilfield art and need little explanation to the ordinary skilled oilfield artisan.

Many of the inventive compositions are moisture sensitive. For those that are moisture sensitive, another application would be as a moisture getter, as in situations where moisture is to be kept out of a system (e.g. with electronic components).

Because hydrogen gas may be generated when many of the inventive compositions come in contact with aqueous media, the resulting circulation or flow of hydrogen may also be considered as a displacement mechanism. Included in this invention are also displacement and flow caused by the byproducts of the dissolution or disintegration of compositions of the invention. An application of hydrogen bubbling would for instance be to homogenize the chemistry and/or temperature of a fluid environment; i.e. displace or help separate other substances. In other embodiments, the compositions and apparatus of the invention may be expanded beyond the foreseen applications of controlling flow and displacement. Many of the compositions and apparatus of the invention may also be considered for hydrogen generation; i.e. for instance for fuel cell applications. The rapid degradation of the composition in water or acids may produce significant volumes of hydrogen that may be considered as an energy source for other systems, such as automotive, aerospace and other transportation systems.

Specific oilfield applications of the inventive compositions include stimulation treatments. Stimulation treatments fall into two main groups, hydraulic fracturing treatments and matrix treatments. Fracturing treatments are performed above the fracture pressure of the reservoir formation and create a highly conductive flow path between the reservoir and the wellbore. Matrix treatments are performed below the reservoir fracture pressure and generally are designed to restore the natural permeability of the reservoir following damage to the near-wellbore area.

Hydraulic fracturing, in the context of well workover and intervention operations, is a stimulation treatment routinely performed on oil and gas wells in low-permeability reservoirs. Specially engineered fluids are pumped at high pressure and rate into the reservoir interval to be treated, causing a vertical fracture to open. The wings of the fracture extend away from the wellbore in opposing directions according to the natural stresses within the formation. Proppant, such as grains of sand of a particular size, is mixed with the treatment fluid keep the fracture open when the treatment is complete. Hydraulic fracturing creates high-conductivity communication with a large area of formation and bypasses any damage that may exist in the near-wellbore area. Compositions of the invention may be used as temporary or supplemental proppant materials.

In the context of well testing, hydraulic fracturing means the process of injecting one or more fluids into a closed wellbore with powerful hydraulic pumps to create enough downhole pressure to crack or fracture the formation. This allows injection of proppant into the formation, thereby creating a plane of high-permeability sand through which fluids can flow. The proppant remains in place once the hydraulic pressure is removed and therefore props open the fracture and enhances flow into the wellbore. Proppants comprising a composition of the invention may be made to degrade after a given time period, under certain downhole conditions, to essentially return the formation to the unfractured state.

Acidizing means the pumping of acid into the wellbore to remove near-well formation damage and other damaging substances. Acidizing commonly enhances production by increasing the effective well radius. When performed at pressures above the pressure required to fracture the formation, the procedure is often referred to as acid fracturing. Fracture acidizing is a procedure for production enhancement, in which acid, usually hydrochloric (HCl), is injected into a carbonate formation at a pressure above the formation-fracturing pressure. Flowing acid tends to etch the fracture faces in a nonuniform pattern, forming conductive channels that remain open without a propping agent after the fracture closes. The length of the etched fracture limits the effectiveness of an acid-fracture treatment. The fracture length depends on acid leakoff and acid spending. If acid fluid-loss characteristics are poor, excessive leakoff will terminate fracture extension. Similarly, if the acid spends too rapidly, the etched portion of the fracture will be too short. The major problem in fracture acidizing is the development of wormholes in the fracture face; these wormholes increase the reactive surface area and cause excessive leakoff and rapid spending of the acid. To some extent, this problem can be overcome by using inert fluid-loss additives to bridge wormholes or by using viscosified acids. Fracture acidizing is also called acid fracturing or acid-fracture treatment. Compositions of the invention maybe used in these applications, as the acidic solution may decompose the composition selectively rather than other components or geologic formations.

In the oilfield context, a "wellbore" may be any type of well, including, but not limited to, a producing well, a non-producing well, an injection well, a fluid disposal well, an experimental well, an exploratory well, and the like. Wellbores may be vertical, horizontal, deviated some angle between vertical and horizontal, and combinations thereof, for example a vertical well with a non-vertical component.

Reactive Metals, Alloying Elements, and Alloys

Figure 4:
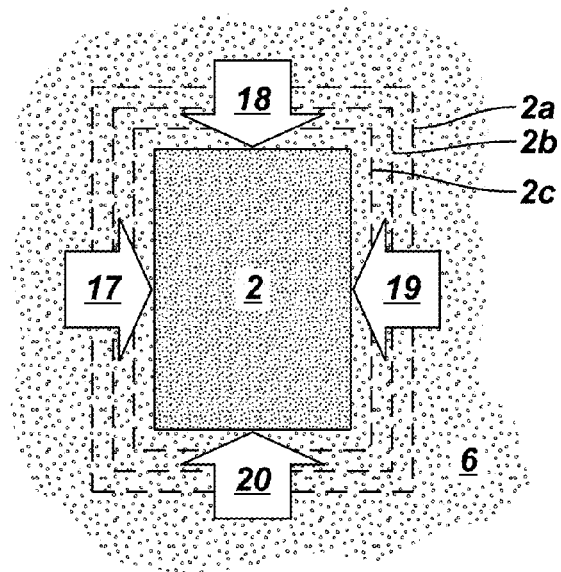
FIGS. 4, 5, and 6 are highly schematic views of degradation mechanisms for compositions and apparatus employing compositions of the invention.
Figure 5:
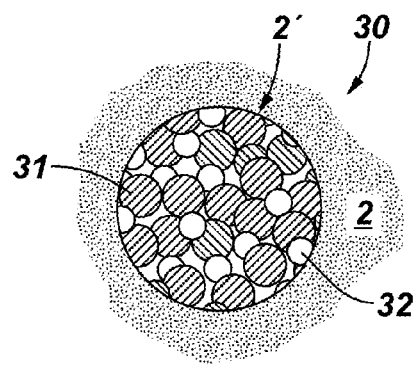

To create compositions within the invention having high-strength (as defined herein) and that have controllable and thus predictable degradation rate, one of the following morphologies, broadly speaking, may be appropriate, depending on the end use; the boundaries between these categories are somewhat arbitrary, and are provided for the purpose of discussion only and are not considered limiting:

1. A reactive, degradable metal or alloy formed into a solidified (cast) or extruded (wrought) composition of crystalline, amorphous or mixed structure (e.g. partially crystalline, partially amorphous), and the features characterizing the resulting and inventive compositions (e.g. grains, phases, inclusions, and like features) may be of macroscopic, micron or submicron scale, for instance nanoscale so as to measurably influence mechanical properties and reactivity. In the context of the invention, the term "reactive metal" includes any element (with the provisos that follow) that satisfies the definition of "reactivity" given earlier herein, and includes any element that tends to form positive ions when its compounds are dissolved in liquid solution and whose oxides form hydroxides rather than acids with water. In the context of the invention, also included among reactive metals (and compositions) are metals (and compositions) that simply disintegrate and in fact may be practically insoluble in the fluid environment; examples of these inventive compositions include alloys that lose structural integrity and become dysfunctional for instance due to grain-boundary embrittlement or dissolution of one of its elements. The byproduct of this degradation from the grain boundaries may not be an ionic compound such as a hydroxide but a metallic powder residue, as appears to be the case of severely embrittled aluminum alloys of gallium and indium. Unless oxidized or corroded at their surfaces, that is superficially degraded, most of these inventive composition are electrically conductive solids with metallic luster; many also possess high mechanical strength in tension, shear and especially compression and therefore exhibit high hardness. Many reactive metals useful in the invention also readily form limited solid solutions with other metals, thus forming alloys, novel alloys and increasingly more complex compositions such as composite and hybrid structures of these novel alloys. Regarding alloying elements in these alloys, very low percentages are often enough to affect to the greatest extent the properties of many metals or, e.g., carbon (C) in iron (Fe) to produce steel. Lithium (Li), magnesium (Mg), calcium (Ca), and aluminum (Al) are considered to be important reactive metals in the inventive compositions. These metals or elements may function as metallic solvents, like iron in steels, or alloying elements, in dilute or high concentrations, like carbon in steels or chromium in stainless steels. Many of the inventive compositions may be termed "degradable alloys", wherein "degradable" may comprise any number of environmental conditions, temperatures, and pressures (including loads and forces). Degradable alloy compositions of the invention include alloy compositions that degrade largely due to the formation of internal galvanic cells between structural heterogeneities (e.g. phases, internal defects, inclusions, and in general internal compositions) and resist or entirely prevent passivation or the formation of stable protective layers. In degradable alloys of the invention, the presence of alloying elements trapped in solid solution, for instance in aluminum, is therefore critical to impede the aluminum from passivating or building a resilient protective layer. In inventive compositions, concentrations of solute elements, trapped in interstitial and especially in substitutional solid solutions may be controlled through chemical composition and processing; for instance rapid cooling from a high temperature where solubility is higher than at ambient temperature or temperature of use. Other degradable compositions of the invention include elements, or phases that liquate (melt) once elevated beyond a certain critical temperature or pressure, which for alloys may be predictable from phase diagrams, or if phase diagrams are unavailable, from thermodynamic calculations as in the CALPHAD method. In these embodiments, the compositions of the invention may intentionally fail by liquid-metal embrittlement, as in some alloys containing gallium and/or indium for instance. Other degradable compositions, including alloys within the invention possess phases that are susceptible to creep (superplastic) deformation under intended forces (and pressures), or possess phases that are brittle and thus rapidly rupture under impact. Examples of degradable compositions, in particular alloys of the invention that fall under this first category are calcium alloys; e.g. calcium-lithium (Ca—Li), calcium-magnesium (Ca—Mg), calcium-aluminum (Ca—Al), calcium-zinc (Ca—Zn), and the like, including more complex compositions like calcium-lithium-zinc (Ca—Li—Zn) alloys without citing their composites and hybrid structures. In calcium-based alloys, alloying addition of lithium in concentrations between 0 up to about 10 weight percent is beneficial to enhance reactivity; greater concentrations of lithium in equilibrium calcium-lithium (Ca—Li) alloys form an intermetallic phase, still appropriate to enhance mechanical properties, but often degrades reactivity slightly. In addition to lithium, in concentrations ranging from 0 up to about 10 weight percent, aluminum, zinc, magnesium, and/or silver in up to about 1 weight percent are also favorable to improve mechanical strengths. Other degradable composition embodiments within the invention include magnesium-lithium (Mg—Li) alloys enriched with tin, bismuth or other low-solubility alloying elements, as well as special alloys of aluminum, such as aluminum-gallium (Al—Ga) or aluminum-indium (Al—In), as well as more complex alloying compositions; e.g. aluminum-gallium-indium (Al—Ga—In), aluminum-gallium-bismuth-tin (Al—Ga—Bi—Sn) alloys, and more complex compositions of these alloys. A non-exhaustive list of degradable alloys is provided in Table 2 in the Examples section. Note that all the inventive compositions of Table 2 are more reactive than aluminum, as proven by their lower galvanic corrosion potentials, consistently 0.5 to 1 Volts below that of aluminum in the selected test conditions. Though galvanic corrosion potentials of the inventive compositions are substantially lower than that of aluminum, magnesium, and even calcium that dissolves at impressive rates, several of the compositions of the invention dissolve, or more generally degrade far slower than calcium despite lower galvanic corrosion potentials, as indicated by the last column of Table 2. For a number of oilfield applications, the degradation rate exhibited by calcium in neutral water is appropriate, as are those of the alloys of Table 2, or more complex compositions like composites made from these alloys. In practical situations, the applications, the users, or both will dictate the needed combination of degradation rate, mechanical properties (particularly strength), and they will both depend upon the environmental conditions (i.e. temperature, pressure, fluid environments) that may also be affected by the user. Even though the degradation rates of many compositions of Table 2 may be low, substantially greater rates may be anticipated in downhole environments, where the fluids are sour and thus more corrosive than the water used in testing the compositions of Table 2. FIG. 4 schematically represents a degradation mechanism of an apparatus comprising a degradable composition of the invention. Illustrated in FIG. 4 is a temporary apparatus comprising a degradable alloy 2 within the invention immersed in a corrosive fluid 6 (for example water or brine). Area 2a indicates the initial size at time $t_0$ of the apparatus, area 2b the size after time $t_1$, area 2c the size after time $t_2$, and so on. In this embodiment, corrosive fluid 6 attacks from all sides as indicated by arrows 17, 18, 19, and 20, although the invention is not so limited. The initial shape of the apparatus may vary widely as well, and may vary in composition, degree of crystallinity, and the like. The degradation, or mass loss by corrosion may proceed, on not proceed on each side simultaneously as illustrated in FIG. 4, depending on the contacting fluid, morphology, and composition of the layers, and whether any protective coatings are applied 2. A powder-metallurgy like structure (i.e. a composition with a structure developed by pressing, compacting, sintering, and the like, formed by various schedules of pressure and temperature) including a relatively reactive metal or alloy (e.g. an alloy of magnesium, aluminum) combined with other compositions (e.g. an alloy of copper, iron, nickel, among a few transition-metal elements) that with the first and relatively reactive composition develops galvanic couples, preferentially strong for a rapid degradation. The result from the combination of these metals, alloys or compositions is a new degradable composition that may be also characterized as a composite composition. However, because of the powder-metallurgy like structure, voids or pores may be intentionally left in order to promote the rapid absorption of corrosive fluid and thus rapid degradation of the formed compositions. Such compositions of the invention may include one or more of fine-grain materials, ultra-fine-grain materials, nanostructured materials as well as nanoparticles for enhanced reactivity (i.e. rates of degradation) as well as low temperature processing or manufacturing. The percentage of voids in such powder-metallurgy composition may be controlled by the powder size, the composition-making process, and the process conditions such that the mechanical properties and the rates of degradation become predictable and within the requirements of the applications or end users. FIG. 5 schematically illustrates an embodiment 30 of a pressed, compacted, or sintered composition 2 of the invention that has been fabricated from different powders, as illustrated in area 2'. Examples of such compositions may include sintered end products of ultrafine powders of magnesium (represented by spheres 31) and copper (represented by spheres 32); an example where magnesium and aluminum will develop a galvanic cell and where magnesium is due to its lower galvanic corrosion potential anodic whereas aluminum is necessarily cathodic. Selecting from the galvanic series elements that are as different as possible in galvanic potential is one way of manufacturing these compositions.

Figure 6:
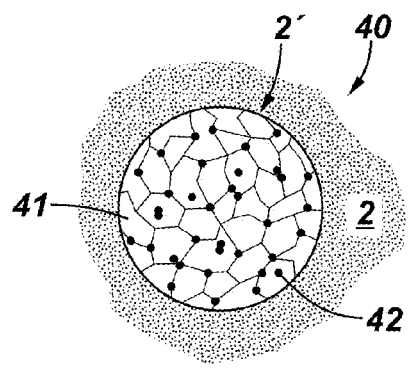

3. Composite and hybrid structures comprising one or more reactive or degradable metals or alloys as a matrix, imbedded with one or more relatively non-reactive compositions of micro-to-nanoscopic sizes (e.g. powders, particulates, platelets, whiskers, fibers, compounds, and the like) or made from the juxtaposition of layers, bands and the like, as for instance in functionally-graded materials. In contrast with compositions in category 2, these compositions of the invention are closer to conventional metal-matrix composites in which the matrix is degradable and the imbedded materials are inert and ultra-hard so as to purposely raise the mechanical strength of the formed composition. Also in contrast with compositions in category 2, voids, pores and other spaces where the corrosive fluid could rapidly infiltrate the composition are not particularly desirable as the matrix is already degradable, and primarily needs a reinforcement. FIG. 6 schematically illustrates an embodiment 40 of a metal-matrix composite structure 2, illustrated in more detail in area 2' with metal matrix 41 and the relatively non-reactive composition illustrated as spheres 42. Metal matrix 41 may be comprised of any reactive metal (e.g. pure calcium, Ca) or degradable alloy from previous categories (e.g. aluminum-gallium based alloy, Al—Ga), while relatively non-reactive compositions useful in the invention include particles, particulates, powders, platelets, whiskers, fibers, and the like that are expected to be inert under the environmental conditions expected during use. Examples of these inventive composite structures include aluminum-gallium (Al—Ga) based alloys (including complex alloys of aluminum-gallium (Al—Ga), aluminum-gallium-indium (Al—Ga—In), aluminum-gallium-indium-bismuth (Al—Ga—In—Bi) as examples) reinforced with, for example, silicon carbide (SiC), boron carbide (BC) particulates (silicon carbide and boron carbide are appropriate for casting because of their densities, which are comparable to that of aluminum-gallium based alloys). Mechanical strength and its related properties, hardness, for the inventive composite structures wherein one composition is blend to another, or several others may be estimated by a lever rule or rule of mixture, where strength or hardness of the metal-matrix composite is typically proportional to volume fraction of the material strength (hardness) of both matrix and reinforcement materials. Consequently, strength and hardness of these compositions lie anywhere between that of the materials comprising the composite (e.g. from low-metallic fractions to extremely high, and correspondingly from high to low silicon carbide or boron carbide reinforcement fractions).

For many compositions of the invention, enhanced mechanical properties (e.g. strength, toughness) may be achieved from highly-reactive metals (e.g. calcium) or moderately reactive metals (aluminum, magnesium) by means of alloying or additions of other, relatively inert compositions, imbedded in the reactive metal or degradable alloy (thus forming a metal-matrix composite). For alloys, the strengthening mechanisms are those by solid-solution (interstitial and substitutional), phase formation (e.g. intermetallic phases), grain refinement (Hall-Petch type strengthening), substructure formation, cold-working (dislocation generation), and combination of these. In degradable alloys of the invention developed from calcium-magnesium (Ca—Mg), calcium-aluminum (Ca—Al), calcium-zinc (Ca—Zn), calcium-lithium (Ca—Li) for instance the formation of calcium intermetallic phases or compounds results in a significant strengthening; a strengthening that adds to the solid-solution strengthening of the calcium lattice provided by the elements trapped within. In magnesium-lithium (Mg—Li), calcium-lithium based alloys (Ca—Li) of the invention, strengthening by precipitation after ageing heat treatment may occur and, when combined with the other strengthening mechanisms, generate even greater strengthening. As part of this invention, in aluminum-based degradable alloys of the invention, solid-solution strengthening and grain refinement are important to reach suitable strength levels. Precipitation is also possible after appropriate heat-treatment such as solutionizing, quench and aging to further strengthen certain alloys of the invention.

Degradable alloy compositions of the invention may be preferred for many applications due to their relatively low fabrication costs. Of the degradable alloys of the invention, aluminum-based alloys may be regarded as more suitable than calcium-based alloys because of their non-UN rating and ease of procurement, as well as their relatively good strengths compared to other compositions.

Figure 7:
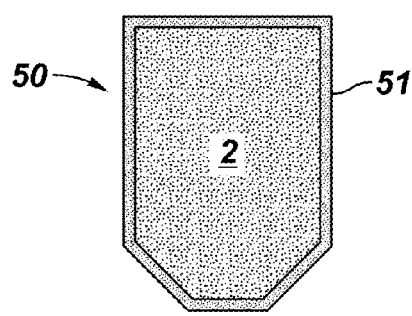
FIG. 7 is a cross-sectional view of another apparatus of the invention.

The inventive compositions may subsequently be coated so that the resulting, coated apparatus no longer presents substantial risks to handling, shipping and other personnel, and in general its environment, unless this environment is the environment where this coating and its coated composition (substrate) is designed to degrade; i.e. dissolve, disintegrate, or both. FIG. 7 schematically illustrates an embodiment 50 comprising a coating 51 on a reactive metal or degradable alloy substrate 2. Coating 51 may be characterized as thin or thick, and may range in thickness from millimeters to centimeters in scale. Coating 51 may comprise one coating or several layered coatings, and different regions of substrate may have different compositions of the invention as coatings. Coating 51 may comprise wrapping substrate 2 with a wrapping material, and this is herein considered as a coating. Coating 51, when required, will provide a temporary barrier against the degradation of substrate 2. Coating 51 and substrate 2 may include compositions of the invention as discussed herein. To be specific, coating 51 when selected to be metallic may be made of:

1. Less reactive compositions than the substrate; e.g. a magnesium or aluminum alloy layer covering a calcium or lithium alloy.

2. Low-melting compositions, as found in solder eutectic alloys (e.g. bismuth-tin, Bi—Sn, bismuth-tin-indium, Bi—Sn—In, and the like) combined or not with other compositions to create new composites or hybrid structures. These compositions, though relatively inert, may creep (i.e.

superplastically deform over time at low stress levels) and thus fail when stressed or pressured, or melt in the presence of a heat flux or elevated pressures and expose the more reactive substrate that is temporarily protected by these coatings. Several examples of commercially available low-melting alloys are given in Table 1.

3. Other metallic compositions that form either low-melting point phases (e.g. intermetallic phases or compounds with melting temperatures lower than that of the main phases of the composition) or brittle phases; i.e. phases that have low toughness and therefore do not plastically deform and are especially susceptible to fracture under impact loading conditions (e.g. intermetallic phases with limited active slip systems, amorphous phases, ceramic-type phases such as oxides, etc).

4. Composite and hybrid structures including for instance hygroscopic materials (e.g. metallic compositions combined with hygroscopic additives), layered materials (i.e. multiple layers of distinct compositions), and the like.

TABLE 1

List of low-melting alloy coatings - ranked in order of increasing melting temperature, with compositions in weight percent

| Bi | Sn | Pb | Cd | In | Sb | Liquid (° C./° F.) |
|---|---|---|---|---|---|---|
| 44.0 | 11.3 | 22.6 | 5.3 | 16.1 | — | 52/126 |
| 30.8 | — | — | 7.5 | 61.7 | — | 61.5/143 |
| 50.5 | 12.4 | 27.8 | 9.3 | — | — | 73/163 |
| 48.5 | — | — | 10.0 | 41.5 | — | 77.5/172 |
| 54.0 | 16.3 | — | — | 29.7 | — | 81/178 |
| 52.0 | 15.3 | 31.7 | 1.0 | — | — | 92/198 |
| 15.5 | 32.0 | — | — | — | — | 95/203 |
| 54.0 | 26.0 | — | 20.0 | — | — | 103/217 |
| 67.0 | — | — | — | 33.0 | — | 109/228 |
| 53.7 | 3.2 | 43.1 | — | — | — | 119/246 |
| 32.0 | 34.0 | 34.0 | — | — | — | 133/271 |
| 55.1 | 39.9 | 5.0 | — | — | — | 136/277 |
| 60.0 | — | — | 40.0 | — | — | 144/291 |
| 21.0 | 37.0 | 42.0 | — | — | — | 152/306 |
| 10.0 | 50.0 | 40.0 | — | — | — | 167/333 |
| 25.5 | 60.0 | 14.5 | — | — | — | 180/356 |
| 3.5 | 86.5 | — | — | 4.5 | — | 186/367 |
| 48.0 | 14.5 | 28.5 | — | — | — | 227/441 |
| 100.0 | — | — | — | — | — | 271/520 |

Coating 51 may also be non-metallic or semi-metallic, or a composite of metallic and non- or semi-metallic compositions, including one of more of the following:

1. Any natural or synthetic polymeric material, including thermoplastics, thermosets, elastomers (including thermoplastic elastomers), regardless of permeability for water in the liquid or gaseous form (vapor); examples include epoxy, polyurethane, and rubber coatings. These coating compositions may be formulated from a number of fillers and additives as the end use and cost dictate.

2. Dissolvable polymers and their composites, which by absorbing a corrosive fluid from its environment enable this corrosive fluid to contact with the degradable composition of the substrate and fully degrade this substrate.

3. Swellable polymers and their composites, which through time swell in a fluid environment and enable corrosive fluid from the environment to eventually degrade the substrate composition.

4. Porous ceramics and composites thereof, wherein the transport of corrosive fluid through pores (voids) or other microchannels enable the corrosive fluid to reach the degradable substrate.

5. Oriented and randomly-oriented micro and nanofibers, nanoplatelets, mesoporous nanomaterials and the like, making a more or less tortuous path for the liquid to diffuse through and contact with the substrate composition of the invention.

Coatings useful in the invention include those wherein the coating, if not sufficiently reactive and therefore too inert, may either be damaged or removed to allow the underlying high-strength, degradable, controllably reactive composition to react and degrade by dissolution, disintegration, or both. The dissolution or disintegration of the substrate composition may be activated by one or both of a) temperature, as in applications involving one or more of relatively-hot fluids, electrical discharges and Joule heating, magnetic discharges and induced Joule heating, and an optically-induced heating; and b) pressure, as for a composition that may become semi-liquid (semi-solid) or fully liquid at elevated (downhole) pressure, as described by the Clausius-Clapeyron equation; in this example, the greater the pressure, the closer this composition is to becoming liquid and thus weaken and fail, for instance by creep). In this invention, changes in both temperature and pressure may be continuous, discontinuous, cyclic (repeated) or non-cyclic (e.g. random), lengthy (durable) or short-lived (transient) as in the cases of thermal or mechanical shocks or impacts.

Relatively Inert Components

As mentioned in the Summary of the Invention, apparatus of the invention may comprise a relatively inert component (i.e. not significantly reactive), including a relatively inert shaped element, such as a collet. The relatively inert component functions to limit the degradation of the compositions by limiting either the rate, location (i.e., front, back, center or some other location of the element), or both rate and location of degradation of the inventive composition. The relatively inert component may also function to distribute the sustained mechanical loads at highly-stressed sections, such as at a ball seat; as a result it may contribute to expand the temperature ranges of the more reactive component or components of compositions of the invention such that the relatively inert component is not subject to premature degradation. The relatively inert component may provide structural integrity to the apparatus, such as a well operating element, both during its use, as well as for pumping out the element. Compositions useful in the invention as the relatively inert component are clearly selected to be not water-soluble and resistant to weak acid, hydrocarbons, brine, and other produced or injected well fluids. The relatively inert component may be selected from relatively-inert metals (e.g. iron, titanium, nickel), their alloys, polymeric compositions, compositions soluble over time in strongly acidic compositions, frangible ceramic compositions, and composites of these. Regarding acid resistance, the relatively inert component compositions may be resistant to weak acidic compositions (pH ranging from about 5 to 7) for lengthy time periods, for example days, weeks, months, and even years, but resistant to strongly acidic compositions having pH ranging from about 2 to about 5, for relatively shorter time periods, for example weeks, days, or even hours, depending on operator preference and the particular oilfield operation to be carried out. The relatively inert component may include fillers and other ingredients as long as those ingredients are degradable by similar mechanisms, or if non-degradable, are able to be removed from the wellbore, or left in the wellbore if relatively inert to the environment.

Suitable polymeric compositions for the relatively inert component include natural polymers, synthetic polymers, blends of natural and synthetic polymers, and layered versions of polymers, wherein individual layers may be the same or different in composition and thickness. The term "polymeric composition" includes composite polymeric compositions, such as, but not limited to, polymeric compositions having fillers, plasticizers, and fibers therein. Suitable synthetic polymeric compositions include those selected from thermoset polymers and non-thermoset polymers. Examples of suitable non-thermoset polymers include thermoplastic polymers, such as polyolefins, polytetrafluoroethylene, polychlorotrifluoroethylene, and thermoplastic elastomers. The term "polymeric composition" includes composite polymeric compositions, such as, but not limited to, polymeric compositions having fillers, plasticizers, and fibers therein.

One class of useful compositions for the relatively inert component are the elastomers. "Elastomer" as used herein is a generic term for substances emulating natural rubber in that they stretch under tension, have a high tensile strength, retract rapidly, and substantially recover their original dimensions. The term includes natural and man-made elastomers, and the elastomer may be a thermoplastic elastomer or a non-thermoplastic elastomer. The term includes blends (physical mixtures) of elastomers, as well as copolymers, terpolymers, and multi-polymers. Useful elastomers may also include one or more additives, fillers, plasticizers, and the like.

Examples of thermoplastic compositions suitable for use in relatively inert components according to the present invention include polycarbonates, polyetherimides, polyesters, polysulfones, polystyrenes, acrylonitrile-butadiene-styrene block copolymers, acetal polymers, polyamides, or combinations thereof.

Suitable thermoset (thermally cured) polymers for use in relatively inert components in the present invention include those known in the thermoset molding art. Thermoset molding compositions are generally thermosetting resins containing inorganic fillers and/or fibers. Upon heating, thermoset monomers initially exhibit viscosities low enough to allow for melt processing and molding of an article from the filled monomer composition. Upon further heating, the thermosetting monomers react and cure to form hard resins with high stiffness. Thermoset polymeric substrates useful in the invention may be manufactured by any method known in the art.

Compositions susceptible to chemical attacks by strongly acidic environments may be valuable compositions in the relatively inert component, as long as they can be used in the intended environment for at least the time required to perform their intended function(s). Ionomers, polyamides, polyolefins, and polycarbonates, for example, may be attacked by strong oxidizing acids, but are relatively inert to weak acids. Depending on the chemical composition and shape of the degradable composition of the invention, its thickness, the expected temperature in intended application, for example a local wellbore temperature, the expected composition of the well and injected fluids, including the pH, the rate of decomposition of the relatively inert component may be controlled.

Frangible ceramic compositions useful as relatively inert component compositions include chemically strengthened ceramics of the type known as "Pyroceram" marketed by Corning Glass Works of Corning, N.Y. and used for ceramic stove tops. This is made by replacing lighter sodium ions with heavier potassium ions in a hardening bath, resulting in prestressed compression on the surface (up to about 0.010 inch or 0.0254 cm) thickness) and tension on the inner part. One example of how this is done is set forth in U.S. Pat. No. 2,779,136, assigned to Corning Glass Works. As explained in U.S. Pat. No. 3,938,764, assigned to McDonnell Douglas Corporation, such composition normally had been used for anti-chipping purposes such as in coating surfaces of appliances, however, it was discovered that upon impact of a highly concentrated load at any point with a force sufficient to penetrate the surface compression layer, the frangible ceramic will break instantaneously and completely into small pieces over the entire part. If a frangible ceramic is used for the relatively inert component, a coating or coatings such as described in U.S. Pat. No. 6,346,315 might be employed to protect the frangible ceramic during transport or handling of the inventive well operating elements. The '615 patent describes house wares, including frangible ceramic dishes and drinking glasses coated with a protective plastic coating, usually including an initial adhesion-promoting silane, and a coating of urethane, such as a high temperature urethane to give protection to the underlying layers, and to the article, including protection within a commercial dishwasher. The silane combines with glass, and couples strongly with urethane. The urethane is highly receptive to decoration, which may be transferred or printed onto the urethane surface, and this may be useful to apply bar coding, patent numbers, trademarks, or other identifying information to the inventive well operating elements and other apparatus of the invention.

Regardless of the composition of the relatively inert component, a protective coating may be applied, as mentioned with respect to frangible ceramic relatively inert components. The coating, if used, is also generally responsible for adhering itself to the degradable components, however the invention is not so limited. The coating may be conformal (i.e., the coating conforms to the surfaces of the polymeric substrate), although this may not be necessary in all applications, or on all surfaces of the relatively inert component or any exposed portions of the reactive metal or degradable alloy component. Conformal coatings based on urethane, acrylic, silicone, and epoxy chemistries are known, primarily in the electronics and computer industries (printed circuit boards, for example). Another useful conformal coating includes those formed by vaporization or sublimation of, and subsequent pyrolization and condensation of monomers or dimers and polymerized to form a continuous polymer film, such as the class of polymeric coatings based on p-xylylene and its derivatives, commonly known as Parylene. Parylene coatings may be formed by vaporization or sublimation of a dimer of p-xylylene or a substituted version (for example chloro- or dichloro-p-xylylene), and subsequent pyrolization and condensation of the formed divalent radicals to form a Parylene polymer, although the vaporization is not strictly necessary.

Another class of useful coatings are addition polymerizable resins, wherein the addition polymerizable resins are derived from a polymer precursor which polymerizes upon exposure to a non-thermal energy source which aids in the initiation of the polymerization or curing process. Examples of energy sources that are normally considered non-thermal include electron beam, ultraviolet light (UV), and visible light. Addition polymerizable resins are readily cured by exposure to radiation energy. Addition polymerizable resins can polymerize through a cationic mechanism or a free radical mechanism. Depending upon the energy source that is utilized and the polymer precursor chemistry, a curing agent, initiator, or catalyst may be used to help initiate the polymerization.

Soluble, and Particularly Water-Soluble Coatings

The relatively inert component, if somewhat water-soluble, may be used to deliver controlled amounts of chemicals useful in particular industries, such as wellbore acid fracturing fluids, in similar fashion to controlled release pharmaceuticals. Compositions useful in this sense include water-soluble compositions selected from water-soluble inorganic compositions, water-soluble organic compositions, and combinations thereof. Suitable water-soluble organic compositions may be water-soluble natural or synthetic polymers or gels. The water-soluble polymer may be derived from a water-insoluble polymer made soluble by main chain hydrolysis, side chain hydrolysis, or combination thereof, when exposed to a weakly acidic environment. Furthermore, the term "water-soluble" may have a pH characteristic, depending upon the particular polymer used.

Suitable water-insoluble polymers which may be made water-soluble by acid hydrolysis of side chains include those selected from polyacrylates, polyacetates, and the like and combinations thereof.

Suitable water-soluble polymers or gels include those selected from polyvinyls, polyacrylics, polyhydroxyacids, and the like, and combinations thereof.

Suitable polyvinyls include polyvinyl alcohol, polyvinyl butyral, polyvinyl formal, and the like, and combinations thereof. Polyvinyl alcohol is available from Celanese Chemicals. Dallas. Tex., under the trade designation Celvol. Individual Celvol polyvinyl alcohol grades vary in molecular weight and degree of hydrolysis. Molecular weight is generally expressed in terms of solution viscosity. The viscosities are classified as ultra low, low, medium and high, while degree of hydrolysis is commonly denoted as super, fully, intermediate and partially hydrolyzed. A wide range of standard grades is available, as well as several specialty grades, including polyvinyl alcohol for emulsion polymerization, fine particle size and tackified grades.

Suitable polyacrylics include polyacrylamides and the like and combinations thereof, such as N,N-disubstituted polyacrylamides, and N,N-disubstituted polymethacrylamides. A detailed description of physico-chemical properties of some of these polymers are given in, "Water-Soluble Synthetic Polymers: Properties and Behavior", Philip Molyneux, Vol. I, CRC Press, (1983) incorporated herein by reference.

Suitable polyhydroxyacids may be selected from polyacrylic acid, polyalkylacrylic acids, interpolymers of acrylamide/acrylic acid/methacrylic acid, combinations thereof, and the like.

Adhesion promoters, coupling agents and other optional ingredients may be used wherein a better bond between the compositions of the invention and a protective layer or coating is desired. Mechanical and/or chemical adhesion promotion (priming) techniques may used. The term "primer" as used in this context is meant to include mechanical, electrical and chemical type primers or priming processes. Examples of mechanical priming processes include, but are not limited to, corona treatment and scuffing, both of which increase the surface area of the backing. An example of a preferred chemical primer is a colloidal dispersion of, for example, polyurethane, acetone, isopropanol, water, and a colloidal oxide of silicon, as taught by U.S. Pat. No. 4,906,523, which is incorporated herein by reference.

Relatively inert components of the invention that are polymeric may include, in addition to the polymeric composition, an effective amount of a fibrous reinforcing composition. Herein, an "effective amount" of a fibrous reinforcing composition is a sufficient amount to impart at least improvement in the physical characteristics, i.e., hydrocarbon resistance, toughness, flexibility, stiffness, shape control, adhesion, etc., but not so much fibrous reinforcing composition as to give rise to any significant number of voids and detrimentally affect the structural integrity during use. The amount of the fibrous reinforcing composition in the substrate may be within a range of about 1-40 percent, or within a range of about 5-35 percent, or within a range of about 15-30 percent, based upon the weight of the inert component.

The fibrous reinforcing composition may be in the form of individual fibers or fibrous strands, or in the form of a fiber mat or web (e.g. mesh, cloth). The mat or web can be either in a woven or nonwoven matrix form. Examples of useful reinforcing fibers in applications of the present invention include metallic fibers or nonmetallic fibers. The nonmetallic fibers include glass fibers, carbon fibers, mineral fibers, synthetic or natural fibers formed of heat resistant organic compositions, or fibers made from ceramic compositions.

Other compositions that may be added to polymeric relatively inert components (and metallic components) for certain applications of the present invention include inorganic or organic fillers. Inorganic fillers are also known as mineral fillers. A filler is defined as a particulate composition, typically having a particle size less than about 100 micrometers, preferably less than about 50 micrometers. Examples of useful fillers for applications of the present invention include carbon black, calcium carbonate, silica, calcium metasilicate, cryolite, phenolic fillers, or polyvinyl alcohol fillers. Typically, a filler would not be used in an amount greater than about 20 percent, based on the weight of its matrix. At least an effective amount of filler may be used. Herein, the term "effective amount" in this context refers to an amount sufficient to fill but not significantly reduce the tensile strength of the matrix.

Well operating elements and other apparatus of the invention may include many optional items. One optional feature may be one or more sensors located in the degradable or inert components to detect the presence of hydrocarbons (or other chemicals of interest) in the zone of interest. The chemical indicator may communicate its signal to the surface over a fiber optic line, wire line, wireless transmission, and the like. When a certain chemical or hydrocarbon is detected that would present a safety hazard or possibly damage a downhole tool if allowed to reach the tool, the element may act or be commanded to close a valve before the chemical creates a problem.

FIGS. 13-47 illustrate schematic perspective views of five non-limiting well operating element embodiments 100, 200, 300, 400, and 500 of the invention respectively designed for deployment in a wellbore within a geological formation. An important comment to make is that FIGS. 13-47 illustrate schematically basic features of various plugs (darts) for oilfield operations, but in fact certain features of each embodiment may be combined; e.g. a reinforcing inert component such as illustrated in FIG. 17 combined with a low-melting point trigger such as illustrated in FIG. 14 with an arrow tail such as illustrated in FIG. 16, and so on. It should also be pointed out that coatings are not illustrated for the purpose of illustrating the various apparatus embodiments. Embodiments 200, 300, and 500 may be considered apparatus comprising hybrid compositions within the invention. Embodiment 100 is a plug-shaped well operating element comprising a generally solid cylindrical body 141, a tapered or conical section 144, and flat ends, the cylindrical body and conical section comprising a degradable alloy composition encapsulating a low melting metal trigger material 143 which is adapted to be exposed to wellbore fluids.

FIG. 14 illustrates a schematic perspective view of another well operating element embodiment 200 of the invention. Embodiment 200 is a hybrid composition and includes a cylindrical section 421, a conical section 441, and a flat lead end 461 (end which would be first when flowed in a wellbore) all comprising a degradable composition of the invention. Cylindrical section 421 has, in this embodiment, an end 471, which may be as illustrated, or may be closer to conical section 441 if desired depending on the degree of exposure desired for a trigger material 143 (not shown, positioned as in FIG. 13), which may comprise a low melting metal. End 471 may be tapered as illustrated at 431.

Figure 15:
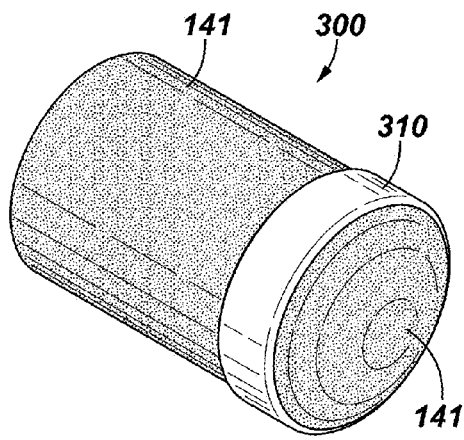
Figure 16:
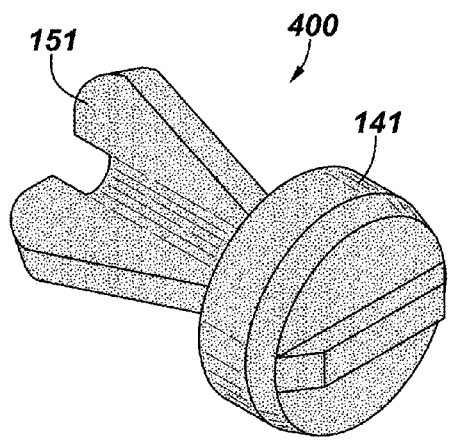

FIG. 15 illustrates a schematic perspective view of an embodiment 300 of the invention, embodiment 300 comprising a bullet-shaped degradable alloy composition 141 of the invention having shape similar to non-degradable component 141 in embodiment 100 of FIG. 13 supported by a ring-shaped inert component 310, which may be plastic, ceramic, metallic, and the like as discussed herein.

Embodiment 400 illustrated schematically in FIG. 16 is a dart-shaped apparatus embodiment of the invention, having a body portion 141 comprised of degradable alloy composition within the invention, and four tail sections 151 also comprised of degradable composition of the invention, which may be the same or different from the degradable composition comprising body portion 141. The particular shape of tails 151 are illustrated as straight for convenience only; they may have curved dimensions. More or less than four tails could be utilized in various embodiments of the invention.

Figure 17A:
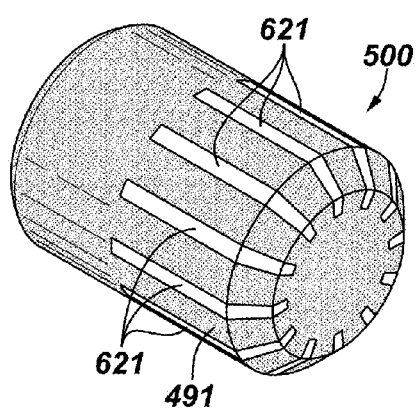
Figure 17B:
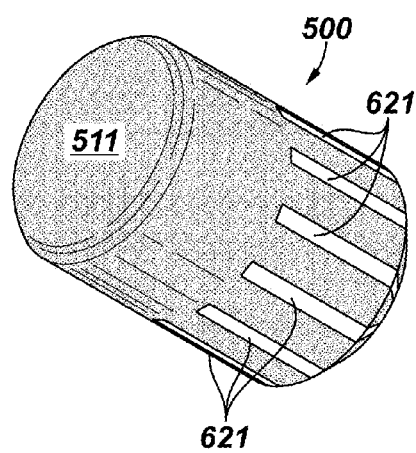

FIGS. 17A and 17B illustrate two schematic perspective views of another well operating element embodiment 500 of the invention. FIG. 17A illustrates generally a forward starboard perspective view, while FIG. 17B is an aft starboard view, using marine terminology. In embodiment 500, the overall shape of the well operating element is similar to embodiment 100 of FIG. 13, although this is not required. Embodiment 500 includes a large, exposed reactive, degradable alloy component 491 covered in certain front and side locations by strips 621 of a relatively inert component composition, which may be the same or different from strip to strip.

Examples and Experimental Results

Figure 8:
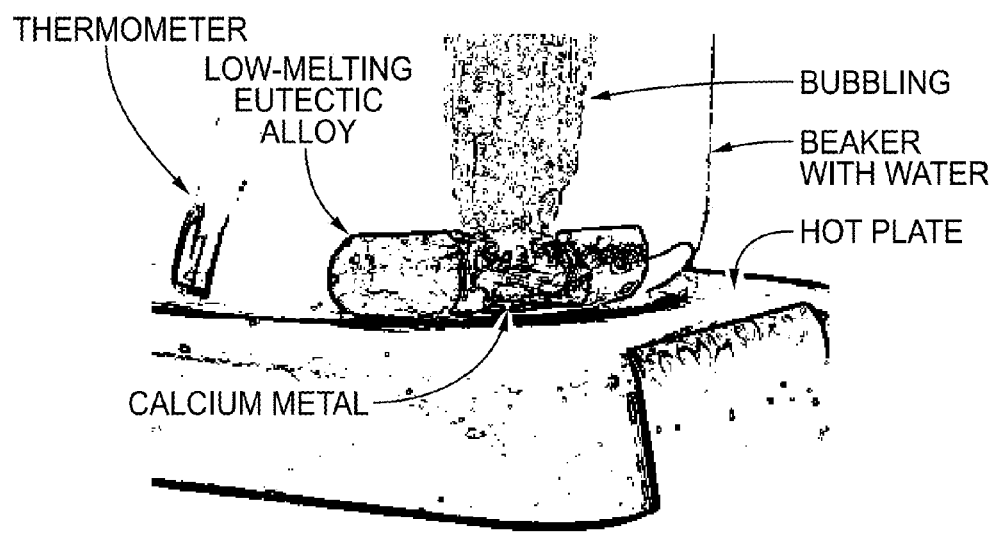
FIG. 8 is a photograph of an experiment illustrating utility of a composition and apparatus within the invention.

FIG. 8 is a photograph of a simple experiment on a sub-sized laboratory sample to first demonstrate the validity of the claims. In FIG. 8 is pictured a extruded calcium rod that was simplistically cast inside a 54Bi-30In-16Sn eutectic alloy for coating purposes, and fully immersed in distilled (neutral-pH) water while subjected to a slow heating from ambient temperature. Once the water temperature exceeded the melting temperature of the coating (i.e. of the eutectic alloy), the coating melted away, exposing the calcium metal to the corrosive fluid (distilled water) and thus triggering its rapid degradation by dissolution. In FIG. 8, the bubbling that may seen in the liquid above the composition is evidence of the release of diatomic hydrogen; i.e. the only gas that may be produced from a simple metallic composition like calcium in water. As demonstrated, a reactive metal such as calcium and a temporary protective coating made for instance of a low-melting alloy may constitute as a useful apparatus of the invention. The reactive material dissolves once the coating fails, either because of a phase transformation such as melting, as in the example of FIG. 8, or simply because its properties are degraded by temperature or pressure, or both, as in the case where the coating is subjected to high stresses (loads), strains (displacements) and is cracked in downhole environments for instance. In the simple experiments shown in FIG. 8, melting was the sole mechanism of failure or apparatus trigger because no external force, or pressure was applied to the apparatus.

Figure 9A:
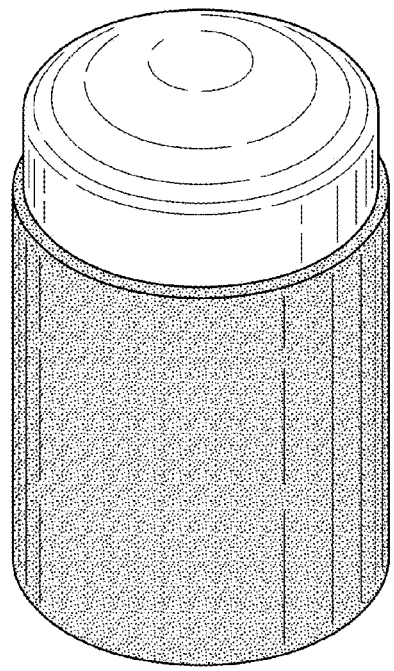
FIG. 9A is a perspective view of an apparatus of the invention, and FIG. 9B a graphical rendition of test data for the apparatus illustrated in FIG. 9A.

FIGS. 9A and 9B demonstrate that a sizeable calcium plug of the invention offers some minimal mechanical properties that are satisfactory for basic downhole applications. This sizeable calcium well plug of FIG. 9A was one of a first full-scale prototype of an entirely degradable composition for the so-called Schlumberger treat and produce (TAP) well operations. FIG. 9B illustrates pressure and temperature testing of the well plug prototype of FIG. 9A. Over a ten hour period, the prototype was first held for thirty minutes at a pressure of about 6000 psi (about 40 mPa) and ambient temperature (about 70° F. or 21° C.); then pressure was reduced to ambient and the temperature raised over a period of about one hour to about 200° F. (about 93° C.). The plug was then held at 200° F. (93° C.) and the pressure rose to about 6000 psi (about 40 mPa) again, and held at this pressure and temperature for two hours. The pressure was then suddenly dropped to about 4000 psi (about 28 mPa) and temperature raised over the course of about 30 minutes to about 250° F. (about 121° C.) and again held for two hours at these conditions. Results from these initial prototype tests demonstrated that pure calcium possessed the minimal properties needed for many TAP applications, and that compositions of the invention with greater strengths than pure calcium would offer improvements over calcium.

Table 2 illustrates a list of pure metals, with certain metals like calcium and magnesium technically commercially available but in reality extremely difficult to procure, and alloy compositions of the invention that were specifically designed to degrade in moist and wet environments. Except for the pure metals, these alloys were all cast at Schlumberger (Rosharon, Tex.) using a regular permanent die-casting method. The alloys were fabricated from blends of pellets and powders of the pure ingredients, cast at 1600° F. (870° C.) for at least 3 hours, stirred, poured into permanent (graphite) molds and air cooled at room temperature (about 25° C.) with no subsequent thermal or thermomechanical treatments. In Table 2 are summarized important results for 16 compositions; 3 pure metals acquired from commercial chemical suppliers followed by 13 cast alloys. In Table 2 are shown the chemical composition in the first row, results of Vickers microhardness indentations from six measurements in columns 2 to 7, average mechanical strength in columns 9 and 11 (estimated from average hardness using a well-known strength-hardness correlation), qualitative results to describe the degradation of the compositions in columns 12 and 13, galvanic corrosion potentials for the various compositions with respect to pure copper in column 14, and in the last column description of test results when the compositions were immersed in distilled and neutral-pH water. Note that the alloys in Table 2 were all aluminum alloys and the alloying elements were selected with the a-priori that they would resist mixing by promoting eutectic transformations, prevent the formation of inert inter-metallic phases or compounds, promote liquid-metal embrittlement (though liquid metal embrittlement is perhaps not the main mechanism of failure), and eliminate alloy passivation (i.e. the formation of a protective film) by making aluminum more reactive. The alloy compositions were kept simple; i.e. typically 5 percent or an integral fraction of 5 percent, although the invention is not so limited. The compositions of Table 2 were therefore not intended to be optimal compositions, but exemplary compositions to display the benefits of these novel aluminum alloys; alloys that may be either used directly as alloys or as ingredients to more advanced compositions, for instance composites and hybrid structures. The results of Table 2 reveal in particular that calcium possesses the least strength of all tabulated compositions and that certain compositions comprising aluminum and gallium degraded at rates that are comparable to (and seemingly greater than) that of calcium. Regardless the degradation rates, note that all the alloys were more anodic than calcium itself, as indicated by the corrosion potentials of Column 14 and that alone demonstrates their remarkable reactivity compared to the pure metals. Nonetheless note that a number of the compositions of Table 2, namely compositions 4, 5, 7 to 11, 13 and 16 were not observed to degrade in distilled (neutral-pH) water, and consequently they are for practical purposes not degradable enough in neutral water alone. A lack of degradation in neutral water was observed in alloys that either did not contain gallium with alloying elements such as indium or bismuth and tin for instance or contained excessive concentrations of magnesium, copper or silicon for instance. Based upon these results in distilled water, corrosion potential alone may be insufficient to identify the appropriate compositions for the foreseen oilfield applications summarized in FIGS. 13 to 17, and the lack of degradation observed in certain alloy indicates that passivation is equally important to consider in designing new compositions. In other words, reactivity, as defined by galvanic corrosion potential, is not incomplete to make the composition degradable, and the absence of a strong protective layer on the composition is crucial to guarantee, unless the fluid environment is made more corrosive, as done by acidizing for instance. To prevent the formation of a protective layer in the composition, alloying elements, even in minor concentrations, are clearly crucial; e.g. gallium and indium promotes degradation whereas magnesium, silicone, copper reduces degradation (however certain elements such as magnesium may be tolerated, as revealed by composition 14). From the results of Table 2, several compositions, namely aluminum-gallium-indium (Al—Ga—In) and aluminum-gallium-zinc-bismuth-tin (Al—Ga—Zn—Bi—Sn) and their derivatives (e.g. metal-matrix composites) demonstrate a potential to outperform pure calcium because of their superior strength as well as degradation rates that are often comparable to that of pure calcium in neutral water (e.g. compositions 6, 12, 14, and 15).

TABLE 2

List of exemplary pure metals and degradable alloys specially developed to degrade in moist and wet environments and results in distilled water at the exception of corrosion potential measured in 5 wt. % sodium chloride (NaCl) distilled water.

| Composition | Vickers microhardness (500 g) | | | | | | | Estimated strength | | |
|---|---|---|---|---|---|---|---|---|---|---|
| | #1 | #2 | #3 | #4 | #5 | #6 | Average | (MPa) | (ksi) | (Normalized) |
| (1) Pure calcium | 23.1 | 23.0 | 23.3 | 22.7 | 23.2 | 23.1 | 23.1 | 69.2 | 10.3 | 1.00 |
| (2) Pure Aluminum | 32.5 | 34.0 | 33.6 | 34.3 | 33.0 | 31.4 | 33.1 | 99.4 | 14.9 | 1.44 |
| (3) Pure Magnesium | 33.7 | 31.4 | 32.1 | 33.1 | 33.8 | 31.3 | 32.6 | 97.7 | 14.6 | 0.98 |
| (4) 80Al—20Ga | 30.7 | 31.0 | 31.6 | 29.8 | 31.6 | 31.2 | 31.0 | 93.0 | 13.9 | 1.34 |
| (5) 80Al—10Ga—10Bi | 28.5 | 31.8 | 35.1 | 34.7 | 35.6 | 35.7 | 33.6 | 100.7 | 15.1 | 1.46 |
| (6) 80Al—10Ga—10In | 31.9 | 33.8 | 33.5 | 30.4 | 35.2 | 35.0 | 33.4 | 100.2 | 15.0 | 1.45 |
| (7) 80Al—10Ga—10Zn | 42.0 | 41.7 | 40.6 | 39.1 | 46.5 | 41.0 | 41.8 | 125.5 | 18.8 | 1.81 |
| (8) 80Al—10Ga—10Mg | 116.6 | 118.3 | 104.0 | 93.1 | 89.6 | 125.8 | 107.9 | 323.7 | 48.4 | 4.68 |
| (9) 85Al—5Ga—5Zn—5Mg | 45.6 | 45.7 | 43.0 | 50.6 | 50.1 | 46.3 | 46.9 | 140.7 | 21.0 | 2.03 |
| (10) 85Al—5Ga—5Zn—5Cu | 46.1 | 41.0 | 47.0 | 50.7 | 44.4 | 45.9 | 45.9 | 137.6 | 20.6 | 1.99 |
| (11) 80Al—5Zn—5Bi—5Sn | 31.8 | 32.4 | 33.3 | 32.8 | 31.9 | 32.6 | 32.5 | 97.4 | 14.6 | 1.41 |
| (12) 80Al—5Ga—5Zn—5Bi—5Sn | 34.6 | 34.6 | 34.3 | 32.4 | 32.4 | 33.6 | 33.7 | 101.0 | 15.1 | 1.46 |
| (13) 90Al—2.5Ga—2.5Zn—2.5Bi—2.5Sn | 37.8 | 34.4 | 31.5 | 32.7 | 27.5 | 31.2 | 32.5 | 97.6 | 14.6 | 1.41 |
| (14) 75Al—5Ga—5Zn—5Bi—5Sn—5Mg | 43.2 | 36.7 | 33.5 | 38.9 | 44.6 | 43.5 | 40.1 | 120.2 | 18.0 | 1.74 |
| (15) 65Al—10Ga—10Zn—5Bi—5Sn—5Mg | 41.0 | 38.7 | 42.2 | 41.6 | 35.6 | 35.8 | 39.2 | 117.5 | 17.6 | 1.70 |
| (16) 80Al—5Ga—5Zn—15Si | 43.76 | 44.2 | 49.4 | 52.6 | 52.8 | 50.2 | 48.8 | 146.5 | 21.9 | 2.12 |

| Composition | Degradation in air* | Degradation in water* | Potential in V** | Degradation rate in distilled Water at 25° C. |
|---|---|---|---|---|
| (1) Pure calcium | 3 | 4 | −1.12 | 0.1 g/min |
| (2) Pure Aluminum | 0 | 0 | −0.60 | Does not dissolve*** |
| (3) Pure Magnesium | 0 | 0 | | Does not dissolve*** |
| (4) 80Al—20Ga | 1 | 1 | −1.02 | Initially reacts and pits over time but does not dissolve*** |
| (5) 80Al—10Ga—10Bi | 3 | 1 | −1.28 | Reacts slowly but does not dissolve |
| (6) 80Al—10Ga—10In | 3 | 4 | −1.48 | ~1 g/min degraded; granular residue*** |
| (7) 80Al—10Ga—10Zn | 1 | 1 | −1.15 | Reacts slowly but does not dissolve*** |
| (8) 80Al—10Ga—10Mg | 0 | 1 | −1.30 | Reacts slightly, does not dissolve*** |
| (9) 85Al—5Ga—5Zn—5Mg | 0 | 0 | −1.28 | Does not dissolve, even after 1 week in water*** |
| (10) 85Al—5Ga—5Zn—5Cu | 0 | 0 | −1.29 | Reacts slowly but does not dissolve after 3 days*** |
| (11) 80Al—5Zn—5Bi—5Sn | 0 | 0 | −1.15 | Does not react with water*** |
| (12) 80Al—5Ga—5Zn—5Bi—5Sn | 4 | 4 | −1.28 | ~1-2 g/min degraded |
| (13) 90Al—2.5Ga—2.5Zn—2.5Bi—2.5Sn | 1 | | −1.36 | Does not dissolve even after 3 days in water*** |
| (14) 75Al—5Ga—5Zn—5Bi—5Sn—5Mg | 2 | 4 | −1.38 | ~1 g/min degraded |
| (15) 65Al—10Ga—10Zn—5Bi—5Sn—5Mg | 2 | 4 | −1.25 | ~2 g/min degraded |
| (16) 80Al—5Ga—5Zn—15Si | 0 | 0 | −1.20 | Slightly reactive, but does not dissolve even after 3 days*** |

*Degradation in air was assessed by the rate of darkening after sample polishing; reactivity in water was assessed from the rate of degradation (0 - least; 4 most reactive)
**Potential (Volts) measured in 5 wt. % sodium chloride (NaCl) distilled water at 25° C. with reference to a pure copper electrode (error in measurement estimated to 10%).
***Does not dissolve, or is not observed to dissolve after 1-week unless galvanically coupled, immersed in a more corrosive aqueous environment, or both.

Figure 10:
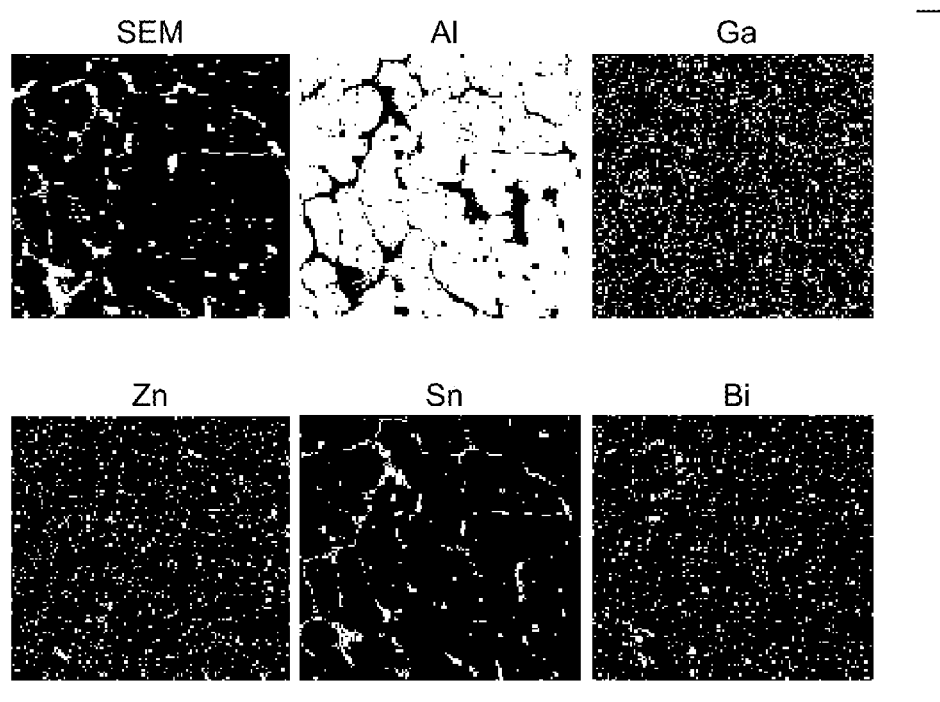
Figure 11:
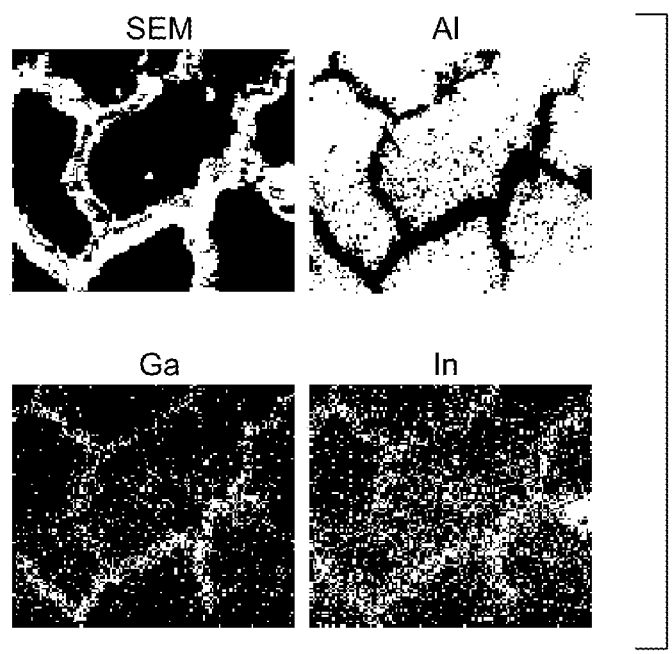

In FIGS. 10 to 12 are examples of alloy microstructures to illustrate and better identify the microstructural characteristics that make certain compositions not only reactive but also highly degradable. FIG. 10 illustrates IXRF-EDS compositional maps of composition 12 (Table 2), consisting of a 80Al-5Ga-5Zn-5Sn-5Bi alloy in its as-cast condition. The non-uniform distribution of the composition, revealed by the various maps of FIG. 10 reveals that certain alloying elements such as tin and bismuth have most noticeably exceeded their solubility limit in solid aluminum. Due to solid solubility limits, these alloying elements have segregated during the slow air-cooling of the cast process to internal surfaces (boundaries) such as the interdendritic spacings. The non-homogeneity of the composition at the microscopic level is well quantified in Table 3 with IXRF-EDS spot analyses of the chemical compositions at selected locations of the microstructure; e.g. aluminum grains or phases along grain boundaries. For the alloy of FIG. 10, gallium is quite uniformly distributed even at the microscopic level and that is in contrast with tin and bismuth that are nearly-exclusively encountered along the internal boundaries. Based upon the results for this alloy in Table 2, the fact that tin and bismuth did essentially not mix with aluminum, as they are segregated to boundaries, promoted the formation of micro-galvanic cells, in particular between aluminum, tin, and bismuth. Also the fact that approximately 5 to 8 percent gallium remained in solid solution in the aluminum (Table 3) appears to be a factor to prevent passivation, or the formation of a protective layer at the surface of the composition. Gallium in solid solution, trapped in the aluminum lattice, also reduces the galvanic corrosion potential, as proven by the results of Table 2 for the binary aluminum-gallium alloy (Al—Ga). In addition to 5 to 8 percent gallium, approximately 2 percent zinc and 2 to 4 percent bismuth was also found trapped in the aluminum. The contribution of 2 percent zinc in the aluminum is well-known to strengthen the lattice by solid solution. The contribution of bismuth on strength is unclear, and the fact that bismuth was repeatedly detected within grains remains also surprising since bismuth is normally insoluble in solid aluminum, as depicted by the aluminum-bismuth (Al—Bi) equilibrium phase diagram (though to be confirmed, the preliminary measurements suggest that the other alloying elements, in particular gallium, increases bismuth solid solubility).

TABLE 3

EDS composition measured at dendrite/grain boundaries and centers of randomly-selected grains in the Al—5Ga—5Zn—5Sn—5Bi alloy. Composition in wt. %

| Al | Zn | Ga | Sn | Bi | Total | Location |
| --- | --- | --- | --- | --- | --- | --- |
| 1.81 | 0.77 | 2.49 | 81.66 | 13.27 | 100.00 | Grain boundary phase |
| 26.52 | 2.36 | 22.57 | 38.21 | 10.34 | 100.00 | Grain boundary phase |
| 14.11 | 1.03 | 4.73 | 64.58 | 15.55 | 100.00 | Grain boundary phase |
| 2.70 | 0.70 | 2.17 | 90.61 | 3.82 | 100.00 | Grain boundary phase |
| 0.44 | 0.39 | 4.88 | 87.04 | 7.25 | 100.00 | Grain boundary phase |
| 81.15 | 3.62 | 5.97 | 5.97 | 3.29 | 100.00 | Center of grain |
| 86.13 | 2.13 | 6.77 | 0.89 | 4.08 | 100.00 | Center of grain |
| 89.13 | 2.18 | 5.39 | 0.74 | 2.57 | 100.00 | Center of grain |
| 86.63 | 2.35 | 7.21 | 1.26 | 2.55 | 100.00 | Center of grain |
| 84.18 | 2.03 | 8.11 | 1.65 | 4.03 | 100.00 | Center of grain |

FIG. 11 presents another set of IXRF-EDS compositional maps for composition 6 (Table 2), representing a ternary aluminum alloy having 10-weight percent gallium and 10-weight percent indium. This alloy, Al-10Ga-10In, was the most reactive of all alloys of Table 2, as it degraded in cold water seemingly even faster than pure calcium. In this alloy composition (not like for composition 12, FIG. 10), gallium clearly exceeded its solubility limit since it was encountered along the grain boundaries, more specifically over the surfaces of the aluminum dendrite arms. Like in the alloy composition of FIG. 10, gallium also promoted the formation of a galvanic cell with the gallium and indium saturated aluminum. Based upon FIG. 11, the exact same remark is also applicable to indium that is seen to be more heavily concentrated at grain boundaries, or dendrite arms. It is therefore suspected that indium, like gallium did not allow the aluminum to passivate which resulted in a rapid degradation from the grain boundaries (FIGS. 12, 12A, 12B, 12C, and 12D) even in direct contact with ambient humidity (FIG. 12). As indicated in Table 2, the composition of FIG. 11 was observed to immediately tarnish in air, as attributed to ambient humidity, and in water it was found to degrade at astonishing rates. FIG. 12 shows a high-magnification scanning electron micrograph of the surface of composition 6 about 1 minute after its surface had been polished. As can be seen from FIG. 12, the surface was at least in certain locations already severely degraded. As already mentioned, FIG. 12A to 12D shows that the composition was degraded from the grain boundaries. The degradation byproduct, due to its non-metallic appearance (FIG. 12) and the presence of oxygen (FIG. 12D) is typical of a non-adherent hydroxide. Like gallium, indium is proven to increase dramatically the reactivity and degradability of aluminum alloys, and when combined with gallium, the effects on reactivity and degradability are considerable, as proven by composition 6. Both aluminum and indium, in addition to creating microgalvanic cells, prevent aluminum from building up a protective scale, or film.

Well operating elements of the invention may include many optional items. One optional feature may be one or more sensors located in the first or metallic component to detect the presence of hydrocarbons (or other chemicals of interest) in the zone of interest. The chemical indicator may communicate its signal to the surface over a fiber optic line, wire line, wireless transmission, and the like. When a certain chemical or hydrocarbon is detected, then alerting that a safety hazard is imminent or a downhole tool is for instance damaged, the element may act or be commanded to shut a valve before the chemical creates more problems.

In summary, generally, this invention pertains primarily to inventive compositions, apparatus incorporating same, and methods of use. Apparatus of the invention may comprise a relatively inert component and a component of a degradable composition as described herein, and optionally a relatively inert protective coating, which may be conformal, on the outside surface of the either or both components. One useful protective coating embodiment is a Parylene coating. Parylene forms an almost imperceptible plastic conformal coating that protects compositions from many types of environmental conditions. Any process and monomer (or combination of monomers, or pre-polymer or polymer particulate or solution) that forms a polymeric coating may be utilized. Examples of other methods include spraying processes (e.g. electrospraying of reactive monomers, or non-reactive resins); sublimation and condensation; and fluidized-bed coating, wherein, a single powder or mixture of powders which react when heated may be coated onto a heated substrate, and the powder may be a thermoplastic resin or a thermoset resin.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A method of providing a temporary flow barrier in a wellbore, the method comprising:
    providing a wellbore element including a body having two or more tapered fins extending therefrom, wherein the body, the fins, or both are made from at least one reactive metal in major proportion and at least one alloying element in minor proportion selected from the group consisting of aluminum, zinc, magnesium and combinations thereof, wherein a coating is disposed about the body, the fins, or both, and, wherein the coating includes aluminum;
    depositing the wellbore element into a tubing string so that the wellbore element engages and cooperates with a seat to block fluid flow therepast;
    pumping stimulation fluid into the tubing string to stimulate an area of the wellbore above the seat, the wellbore element having structural integrity to withstand the fluid pressure; and
    degrading the wellbore element so that the wellbore element and seat allow for the flow of fluid past the seat.

2. The method of claim 1 wherein the alloying element includes nanomaterials.

3. The method of claim 1, wherein the fins taper radially-inward from a first end distal the body to a second end proximal the body.

4. The method of claim 1, wherein the fins are axially offset from the body.

5. The method of claim 1, wherein the reactive metal comprises aluminum.

6. A method of providing a temporary flow barrier in a wellbore, the method comprising:
    providing a coated metallic powder including aluminum;
    sintering the coated metallic powder to provide the oilfield element, the oilfield element including a body having two or more tapered fins extending therefrom, wherein the body, the fins, or both are made from at least one reactive metal in major proportion;
    depositing the oilfield element into a tubing string so that the wellbore element engages and cooperates with a seat to block fluid flow therepast;
    pumping stimulation fluid into the tubing string to stimulate an area of the wellbore above the seat, the oilfield element having structural integrity to withstand the fluid pressure; and
    degrading the oilfield element so that the oilfield element and seat allow for the flow of fluid past the seat.

7. The method of claim 6 wherein the coated metallic powder further includes magnesium.

8. The method of claim 6 wherein the coated metallic powder includes nanomaterials.

9. The method of claim 6, wherein the reactive metal comprises aluminum.

10. The method of claim 6, wherein the fins taper radially-inward from a first end distal the body to a second end proximal the body.

11. The method of claim 6, wherein the fins are axially offset from the body.

* * * * *